(12) United States Patent
Tallman

(10) Patent No.: US 10,423,851 B2
(45) Date of Patent: Sep. 24, 2019

(54) METHOD, APPARATUS, AND COMPUTER-READABLE MEDIUM FOR PROCESSING AN IMAGE WITH HORIZONTAL AND VERTICAL TEXT

(71) Applicant: Konica Minolta Laboratory U.S.A., Inc., San Mateo, CA (US)

(72) Inventor: Charles David Tallman, Denver, CO (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 50 days.

(21) Appl. No.: 15/908,308

(22) Filed: Feb. 28, 2018

(65) Prior Publication Data

US 2019/0266431 A1 Aug. 29, 2019

(51) Int. Cl.
*G06K 9/34* (2006.01)
*G06T 11/20* (2006.01)

(52) U.S. Cl.
CPC .............. *G06K 9/344* (2013.01); *G06K 9/348* (2013.01); *G06T 11/20* (2013.01); *G06K 2209/011* (2013.01); *G06T 2210/12* (2013.01)

(58) Field of Classification Search
CPC .... G06F 17/241; G06K 2209/17; G06K 7/00; G06K 7/01; G06K 9/00711

USPC ......................................................... 382/177
See application file for complete search history.

(56) References Cited

U.S. PATENT DOCUMENTS

| 5,937,084 A * | 8/1999 | Crabtree ............... G06K 9/2054 |
| | | 382/137 |
| 9,760,788 B2 * | 9/2017 | Shustorovich ..... G06K 9/00463 |
| 2013/0022270 A1 | 1/2013 | Kahle |
| 2016/0357784 A1 * | 12/2016 | Ash ....................... G06K 9/6215 |

* cited by examiner

*Primary Examiner* — Charlotte M Baker
(74) *Attorney, Agent, or Firm* — Squire Patton Boggs (US) LLP

(57) ABSTRACT

Speed and accuracy of character recognition can be improved by isolating text orientation during an early stage of processing an image containing a mixture of horizontal and vertical text. Vertical and horizontal line bounding boxes are defined from characters in the image. In a section of the image containing horizontal text, vertical line bounding boxes may tend to be larger and/or spaced close together due to misalignment of characters. For the same reason, horizontal line bounding boxes may tend to be larger and/or spaced closed together in a section of the image containing vertical text. Such variations in size and/or spacing may be used to identify a division between the horizontal and vertical text. A subsequent character recognition process may take advantage of a known division to conserve computing resources.

15 Claims, 14 Drawing Sheets

METHOD, APPARATUS, AND COMPUTER-READABLE MEDIUM FOR PROCESSING AN IMAGE WITH HORIZONTAL AND VERTICAL TEXT

FIELD

This disclosure relates generally to image processing and, more particularly, to processing an image containing horizontal and vertical text.

BACKGROUND

Document image processing often involves a character recognition process, such as OCR or ICR, that identifies objects in the image as specific characters and/or words. Character recognition processes allow an image to become machine readable. They may also facilitate conversion or encoding of the image to an editable format that may be used in a word processing program. Also, the output for character recognition processes can be used to index and access large repositories of text images according their contents.

Some document images may include a mixture of text arranged horizontally and vertically. Applicant has found that character recognition processes may benefit from knowing where horizontal text starts or ends relative to vertical text, and vice versa. For example, having located a division between horizontal and vertical text, a character recognition process may proceed with a reliable assumption that an entire area contains only vertical text, and need not expend resources to evaluate character or word groupings in a horizontal direction. Thus, speed and accuracy of character recognition can be improved by isolating text orientation during an early stage of image processing. With ever increasing demands for speed and accuracy, there is a need for a method, apparatus, and program that may help satisfy these needs.

SUMMARY

Briefly and in general terms, the present invention is directed to a method, apparatus, and non-transitory computer readable medium for processing an image containing a mixture of horizontal and vertical text.

In aspects of the invention, a method for processing an image containing horizontal text arranged in a horizontal direction and vertical text arranged in a vertical direction, comprises determining a horizontal score for a plurality of horizontal line bounding boxes, the horizontal score determined from one or both of size and spacing of the horizontal line bounding boxes, the plurality of horizontal line bounding boxes defined from character connected components in the horizontal text and the vertical text, each of the horizontal line bounding boxes occupying a position interval in the vertical direction; determining a vertical score for a plurality of vertical line bounding boxes, the vertical score determined from one or both of size and spacing of the vertical line bounding boxes, the plurality of vertical line bounding boxes defined from the character connected components in the horizontal text and the vertical text, each of the vertical line bounding boxes occupying a position interval in the horizontal direction; comparing the horizontal score and the vertical score; and determining from the comparison of the horizontal and vertical scores, either a position of a horizontal division between the horizontal and vertical texts or a position of a vertical division between the horizontal and vertical texts.

In aspects of the invention, a method for processing an image containing horizontal text and vertical text, comprises evaluating a plurality of first-direction line bounding boxes encompassing the horizontal text and the vertical text, each of the first-direction line bounding boxes defined from character connected components arranged sequentially along a first direction being a horizontal direction or a vertical direction, each of the first-direction line bounding boxes occupying a position interval in a second direction different from the first direction, the evaluating comprising for each of the position intervals of the first-direction line bounding boxes, determining whether the position interval is a positive position interval or a negative position interval, the position interval determined to be a positive position interval when the position interval satisfies one or both of a first-direction evaluating size range and a first-direction evaluating spacing minimum; identifying a first discordant pair of the position intervals among the first-direction line bounding boxes, the first discordant pair having a positive position interval and a negative position interval adjacent to the positive position interval, there being a gap interval between the positive position interval and the negative position interval; and determining a position of a first division between the horizontal and vertical texts as being within the gap interval of the first discordant pair.

In aspects of the invention, an apparatus for processing an image with horizontal text arranged in a horizontal direction and vertical text arranged in a vertical direction, comprises a processor and a memory in communication with the processor. The memory stores instructions and the processor is configured to perform a process on the image according to the stored instructions. The process performed by the processor comprises determining a horizontal score for a plurality of horizontal line bounding boxes, the horizontal score determined from one or both of size and spacing of the horizontal line bounding boxes, the plurality of horizontal line bounding boxes defined from character connected components in the horizontal text and the vertical text, each of the horizontal line bounding boxes occupying a position interval in the vertical direction; determining a vertical score for a plurality of vertical line bounding boxes, the vertical score determined from one or both of size and spacing of the vertical line bounding boxes, the plurality of vertical line bounding boxes defined from the character connected components in the horizontal text and the vertical text, each of the vertical line bounding boxes occupying a position interval in the horizontal direction; comparing the horizontal score and the vertical score; and determining from the comparison of the horizontal and vertical scores, either a position of a horizontal division between the horizontal and vertical texts or a position of a vertical division between the horizontal and vertical texts.

In aspects of the invention, an apparatus for processing an image with horizontal text and vertical text, comprises a processor and a memory in communication with the processor. The memory stores instructions and the processor is configured to perform a process on the image according to the stored instructions. The process performed by the processor comprises evaluating a plurality of first-direction line bounding boxes encompassing the horizontal text and the vertical text, each of the first-direction line bounding boxes defined from character connected components arranged sequentially along a first direction being a horizontal direction or a vertical direction, each of the first-direction line bounding boxes occupying a position interval in a second direction different from the first direction, the evaluating comprising for each of the position intervals of the first-direction line bounding boxes, determining whether the position interval is a positive position interval or a negative position interval, the position interval determined to be a positive position interval when the position interval satisfies one or both of a first-direction evaluating size range and a first-direction evaluating spacing minimum; identifying a first discordant pair of the position intervals among the first-direction line bounding boxes, the first discordant pair having a positive position interval and a negative position interval adjacent to the positive position interval, there being a gap interval between the positive position interval and the negative position interval; and determining a position of a first division between the horizontal and vertical texts as being within the gap interval of the first discordant pair.

In aspects of the invention, a non-transitory computer-readable medium has stored thereon computer readable instructions that, when executed by a processor of an apparatus, cause the apparatus to perform a process on an image with horizontal text arranged in a horizontal direction and vertical text arranged in a vertical direction. The process performed by the apparatus comprises determining a horizontal score for a plurality of horizontal line bounding boxes, the horizontal score determined from one or both of size and spacing of the horizontal line bounding boxes, the plurality of horizontal line bounding boxes defined from character connected components in the horizontal text and the vertical text, each of the horizontal line bounding boxes occupying a position interval in the vertical direction; determining a vertical score for a plurality of vertical line bounding boxes, the vertical score determined from one or both of size and spacing of the vertical line bounding boxes, the plurality of vertical line bounding boxes defined from the character connected components in the horizontal text and the vertical text, each of the vertical line bounding boxes occupying a position interval in the horizontal direction; comparing the horizontal score and the vertical score; and determining from the comparison of the horizontal and vertical scores, either a position of a horizontal division between the horizontal and vertical texts or a position of a vertical division between the horizontal and vertical texts.

In aspects of the invention, a non-transitory computer-readable medium has stored thereon computer readable instructions that, when executed by a processor of an apparatus, cause the apparatus to perform a process on an image with horizontal text and vertical text. The process performed by the apparatus comprises evaluating a plurality of first-direction line bounding boxes encompassing the horizontal text and the vertical text, each of the first-direction line bounding boxes defined from character connected components arranged sequentially along a first direction being a horizontal direction or a vertical direction, each of the first-direction line bounding boxes occupying a position interval in a second direction different from the first direction, the evaluating comprising for each of the position intervals of the first-direction line bounding boxes, determining whether the position interval is a positive position interval or a negative position interval, the position interval determined to be a positive position interval when the position interval satisfies one or both of a first-direction evaluating size range and a first-direction evaluating spacing minimum; identifying a first discordant pair of the position intervals among the first-direction line bounding boxes, the first discordant pair having a positive position interval and a negative position interval adjacent to the positive position interval, there being a gap interval between the positive position interval and the negative position interval; and determining a position of a first division between the horizontal and vertical texts as being within the gap interval of the first discordant pair.

The features and advantages of the invention will be more readily understood from the following detailed description which should be read in conjunction with the accompanying drawings.

BRIEF DESCRIPTION OF THE DRAWINGS

FIG. 1 is an example image with a mixture of horizontal Japanese text and vertical Japanese text.

FIG. 5A shows example horizontal line bounding boxes defined from character connected components of FIG. 1.

FIG. 7A shows example vertical line bounding boxes defined from character connected components of FIG. 1.

DETAILED DESCRIPTION

As used herein, the term "image" encompasses any one or a mixture of photographs, pictures, illustrations, text, and other graphical objects. For example, an image can be a scanned page of a printed publication or a handwritten note, or a photograph of a street scene.

As used herein, the term "characters" refers to characters that can be alphanumeric, phonetic, semantic, and the like. The term encompasses mathematical symbols. The term encompasses Japanese characters, Chinese characters, Korean characters, and other characters and letters used in written language. The term encompasses Greek and Latin letters, and other types of letters used in written language.

As used herein, a binary image is a bi-tonal image in which each one of all pixels in the image has one of only two available values. For example, a binary image can be a black and white image in which pixels have one of two available values, namely a value corresponding to white and a value corresponding to black.

In a binary image, foreground objects such as text may be represented by black pixels. If so, black pixels may be referred to as foreground pixels, and white pixels may be referred to as background pixels. Also the reverse is possible, in that foreground objects such as text may be represented by white pixels. If so, white pixels may be referred to as foreground pixels, and black pixels may be referred to as background pixels. In addition, binary color schemes other than black-white are possible.

Figure 1:
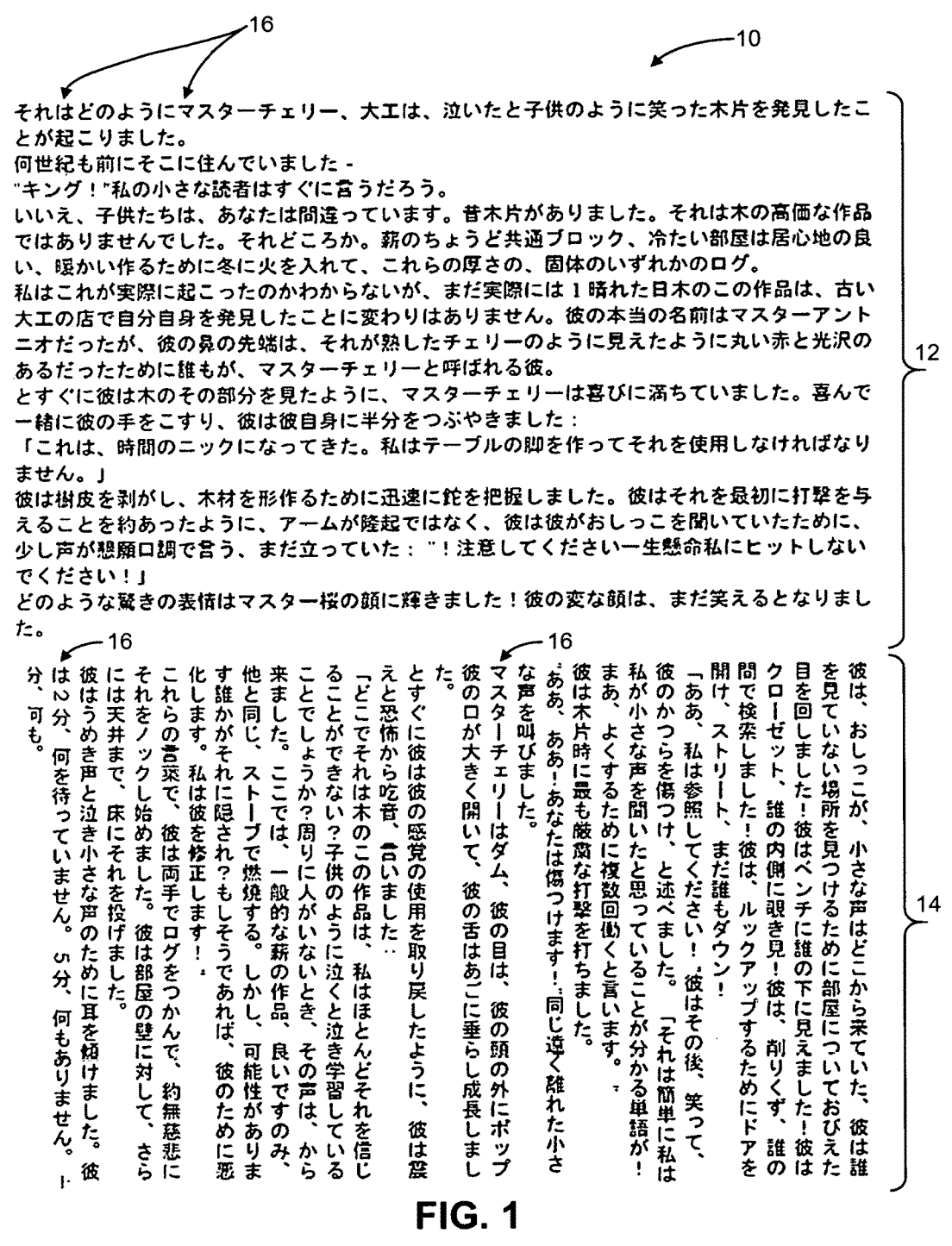
Figure 2:
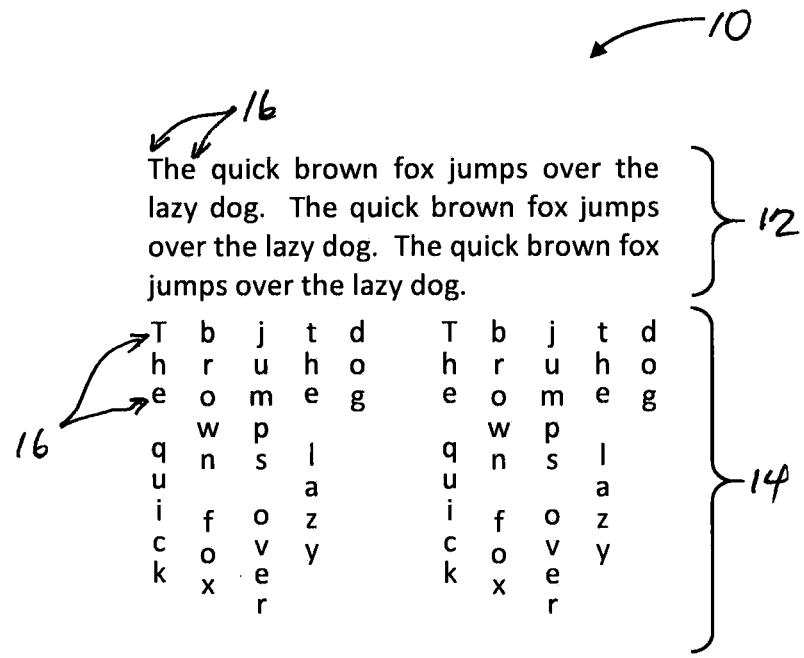
FIG. 2 is an example image with a mixture of horizontal English text and vertical English text.

Referring now in more detail to the example drawings for purposes of illustrating aspects of the invention, wherein like reference numerals designate corresponding or like elements among the several views, there is shown in FIG. 1 example image 10 with a mixture of Japanese horizontal text 12 and vertical text 14. Characters 16 in horizontal text 12 and characters 16 in vertical text 14 have a common (i.e., the same) orientation, namely upright. That is, characters 16 in vertical text 14 are not turned sideways or rotated 90 degrees relative to characters 16 in horizontal text 12. The same is true in FIG. 2, which shows example image 10 with a mixture of English horizontal text 12 and vertical text 14. Although descriptions herein often refer to examples with Japanese text, it is to be understood that the present invention is not limited to text of a particular language.

Image 10 is subjected to a connected component (CC) finding process to identify individual strokes. The process finds foreground pixels that are connected to (i.e., touch) another foreground pixel. Some characters, such as the lower case letter i, consist of two strokes, namely a vertical line and a dot above the vertical line. Thus, more than one connected component may be found for a character. An image may contain several, hundreds, and even thousands of connected components.

Image 10 could be a binary image. Image 10 can be obtained from an input image in a png, jpg, or other format containing a rectangular matrix of color or grayscale pixels. In the input image, the center of characters may be black, but some of the edges may be gray or other color. To facilitate the CC finding process, the input image may be subjected to a binarization process to convert it to a binary image before the CC finding process is performed. The resulting binary image can be in a bitmap format, for example. A binarization process may include selecting a binarization threshold value, and then comparing the grayscale value of each pixel of the input image to the binarization threshold value to determine a binary value (e.g., black or white) to be assigned to that pixel. Thresholding algorithms known in the art attempt to identify an optimal threshold value that balances the need to preserve information likely to be of interest and to discard background noise.

In the input image and/or the resulting binary image, any noise may be removed using algorithms known in the art. For example, morphological erosion and dilation techniques can be used to remove noise and provide image 10 ready for the CC finding process.

Once identified, each of the connected components is analyzed (referred to herein as a CC analysis) to calculate its height ($H\_cc$), width ($W\_cc$), and stroke thickness ($T\_cc$). The height and width can be the height and width of a bounding box of the connected component. The bounding box of a connected component is defined as the smallest rectangle that contains the pixels of the connected component. As used herein, the term "character bounding box" and the abbreviation CBB refers to the bounding box of any connected component in image 10.

Figure 3:
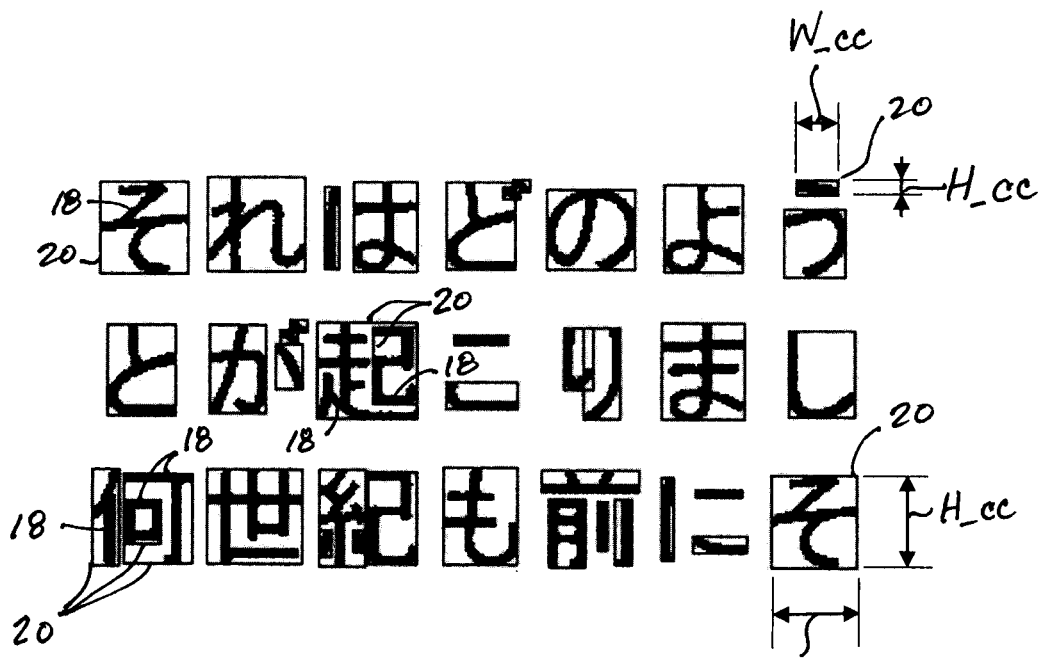
FIG. 3 shows example character connected components obtained from the text of FIG. 1.

FIG. 3 is an enlarged view of the top-left portion of FIG. 1, showing connected components 18 and character bounding boxes 20. Individual characters may comprise multiple character connected components 18, in which case a character bounding box 20 may be contained within another character bounding box 20. Height $H\_cc$ can be the vertical dimension, while the width $W\_cc$ can be the horizontal dimension. Stroke thickness $T\_cc$ can be obtained by scanning horizontally and scanning vertically at each pixel in the connected component, obtaining a count of the number of consecutive foreground pixels for each scan, and taking the average of all counts. Other methods may be used to determine $T\_cc$. The CC analysis is performed for all connected components in image 10. Thereafter, a median height ($H\_m$), a median width ($W\_m$), and an average stroke thickness ($T\_avg$) are computed for image 10. No characters have actually been identified using character recognition (for example, OCR or ICR) at this stage, though $H\_m$, $W\_m$, and $T\_avg$ are presumed to be an estimate of character size and thickness.

Image 10 may contain an illustration or other non-text element that may unduly skew values for $H\_m$, $W\_m$, and $T\_avg$. Non-text elements can take the form of extremely large connected components. These extremely large connected components can be filtered out of the calculation for $H\_m$, $W\_m$, and $T\_avg$. In one filtering example, a connected component having a height that is greater than ½ the height of image 10 may be omitted from the calculation of $H\_m$, $W\_m$, and $T\_avg$. In another filtering example, a connected component having $H\_cc$ that is greater than $10 \times H\_m$ can trigger recalculation of $H\_m$, $W\_m$, and $T\_avg$ without this connected component being included in the recalculation. Other criteria can be used for filtering.

Next, a line finding process is performed. The line finding process can be visualized as merging character bounding boxes (CBB) together into a single line of presumed text. As will be explained in detail below, the line finding process is performed horizontally and vertically for all of image 10 without knowing which area contains horizontal text or vertical text. The horizontal line finding process identifies candidates that could be horizontal text. These candidates are in the form of elongated bounding boxes defined from a horizontal sequence of CBB. These candidates are referred to as horizontal line bounding boxes (HBB). The vertical line finding process is identifies candidates that could be vertical text. These candidates are in the form of elongated bounding boxes defined from a vertical sequence of CBB. These candidates are referred to as vertical line bounding boxes (VBB). All the candidates are evaluated for size and spacing relative to one another to obtain a score that is used to identify a division between horizontal and vertical text.

The horizontal line finding process evaluates each character bounding box (CBB) to determine whether it should be merged with an existing horizontal line bounding box or begin a new horizontal line bounding box. For example, this process may proceed from left to right in image 10, starting with the CBB located furthest to the left in image 10, and ending with the CBB located furthest to the right in image 10. The location of each CBB (e.g., an X-axis coordinate of the CBB left edge) is determined ahead of time, during the CC analysis. The current CBB under evaluation is merged with an existing horizontal line bounding box (HBB) if they are sufficiently close to each other in the horizontal direction and sufficiently aligned in the vertical direction. If the current CBB is the first one to be evaluated in image 10, then it starts its own HBB since there are not yet any existing HBB.

Figure 4A:
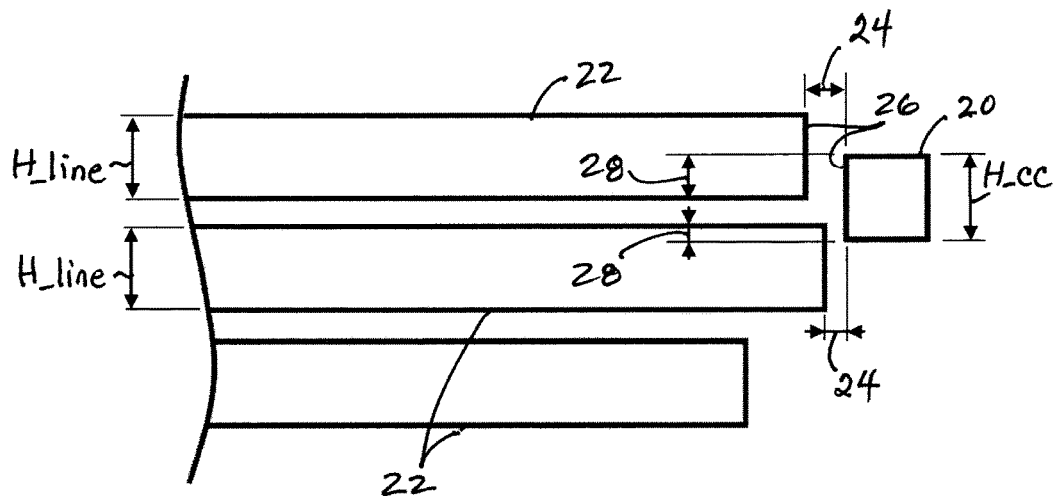
FIGS. 4A-4C are schematic diagrams showing example horizontal line bounding boxes defined from character connected components.

FIG. 4A shows an enlarged example in which many character bounding boxes 20 have been evaluated, which resulted in at least three horizontal line bounding boxes (HBB) 22 to be defined. One CBB 20 is illustrated, which is the current CBB under evaluation. CBB 20 is compared to all existing HBB 22 to determine if any existing HBB is sufficiently close to CBB 20. An existing HBB is sufficiently close in the horizontal direction if horizontal gap 24 between proximal ends 26 of the CBB and HBB is less than or equal to a horizontal gap maximum. The proximal ends are defined as the vertical ends of the CBB and HBB that are nearest to each other. The horizontal gap maximum can be a value that is based on the connected component median width (W_m). For example, the horizontal gap maximum can be 2×W_m. The horizontal gap maximum can be based on the connected component average stroke thickness (T_avg). For example, the horizontal gap maximum can be 8×T_avg. In another example, both W_m and T_avg are considered such that the horizontal gap maximum is equal to the lesser of 2×W_m and 8×T_avg, where 2 and 8 are referred to multipliers. Other multipliers may be used. The multiplier 2 can be replaced with 1.5, 2.5, 3, or other value if needed to provide more reliable results. Also, the multiplier 8 can be replaced with 7, 9, 10, or other value if needed that to provide more reliable results. The horizontal gap maximum is satisfied by the existing HBB when its horizontal gap is less than or equal to the horizontal gap maximum. If there is no existing HBB that satisfies the horizontal gap maximum, the current CBB under evaluation becomes an HBB, i.e., the current CBB under evaluation starts a new horizontal line bounding box. However, it is possible that there are multiple existing HBB that satisfy the horizontal gap maximum.

Next, all existing HBB that satisfied the horizontal gap maximum are compared to the current CBB under evaluation to determine if any of them are sufficiently aligned in the vertical direction. An HBB is sufficiently aligned if projected vertical overlap 28 of the CBB and HBB is greater than or equal to a projected vertical overlap minimum. As shown, it is possible for the CBB and HBB to not touch each other. Vertical overlap 28 is determined from a projection of the CBB 20 toward the HBB 22. A projected vertical overlap occurs when a projection of any of the bottom or top ends of the CBB intersects the HBB. The projected vertical overlap can be measured, for example, as the vertical distance between (A) and (B), where (A) is the bottom or top end of the CBB that interests the HBB, and (B) is the opposite end of the HBB. If the bottom end of the CBB intersects the HBB, the opposite end is the top end of the HBB. If the top end of the CBB intersects, the opposite end is the bottom end of the HBB. If both the top and bottom ends of the CBB intersect the HBB, the projected overlap is equal to the height (H_cc) of the CBB. The projected vertical overlap minimum can be a value that is based on the height (H_line) of the HBB. For example, the projected vertical overlap minimum can be ¼×H_line. The projected vertical overlap minimum can be based on the height (H_cc) of the CBB. For example, the projected vertical overlap minimum can be ¼ H_cc. In another example, both H_line and H_cc are considered such that the projected vertical overlap minimum is equal to the lesser of ¼×H_line and ¼×H_cc. Instead of ¼, another multiplier may be used such as ⅓, ⅕, or other value to obtain more reliable results. The projected vertical overlap minimum is satisfied by the HBB if its projected vertical overlap is greater than or equal to the projected vertical overlap minimum. If there is no HBB that satisfies the projected vertical overlap minimum, the CBB becomes an HBB, i.e., the CBB starts a new horizontal line bounding box. Otherwise, the CBB is merged with the HBB having the greatest projected vertical overlap.

Figure 4B:
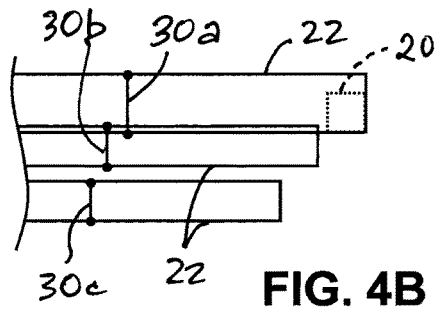

FIG. 4B shows an example result in which current CBB 20 is merged with an existing HBB 22 (referred to as a target horizontal line bounding box). The target HBB is redefined as required to fully enclose current CBB 20. That is, the target HBB is enlarged in the horizontal direction if necessary to enclose the current CBB. The existing HBB is enlarged in the vertical direction if necessary to enclose the current CBB. After all CBB are evaluated, a consolidation process is performed in which any HBB having position intervals that overlap are merged to form a single HBB.

Figure 4C:
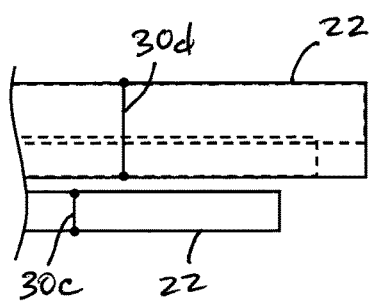

FIG. 4C shows an example result of a consolidation process performed on horizontal line bounding boxes (HBB). FIG. 4C continues from FIGS. 4A and 4B. Assuming that CBB 20 in FIG. 4A is the last CBB to be evaluated for image 10, then two HBB 22 which overlap in FIG. 4B are merged to form a single HBB 22 shown in FIG. 4C. Although only two HBB are merged in this example, it is to be understood that the consolidation process would merge all HBB that overlap. For example, three, four, or more HBB could be merged. Also, it is possible that all HBB are merged into one. Note that it is possible for two positions intervals to overlap even though the corresponding HBBs do not touch. For example, two HBBs may be located on opposite sides of the image and be spaced apart while their position intervals (defined by Y-axis coordinates in the vertical direction) overlap.

Figure 4D:
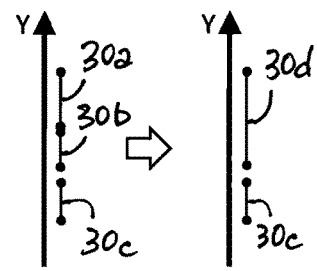
FIG. 4D is a schematic diagram showing an example interval map for the horizontal line bounding boxes of FIGS. 4B and 4C.

FIG. 4D shows an interval map that can be used to perform the consolidation process. Each of the horizontal line bounding boxes (HBB) 22 in FIG. 4B, immediately after completion of the horizontal line finding process, occupies position interval 30 in the vertical direction. Each end of the position intervals has a Y-axis coordinate, which allows each position interval to be evaluated in relation to other position intervals to detect an interval overlap. The Y-axis coordinates can be determined ahead of time, during the CC analysis. Initially, the interval map would include position intervals 30 of all HBB at the start of the consolidation process. During the consolidation process, all intervals are evaluated such that an interval having an endpoint between two endpoints of any other interval would be merged with the other interval to form a single interval in the interval map. In this example, two intervals 30a and 30b are merged to become single enlarged interval 30d. FIG. 4D shows only a few intervals. In general, there may be many more intervals which may also enlarge due to consolidation, if the intervals overlap. Further, two or more enlarged intervals may merge if they overlap.

Figure 5A:
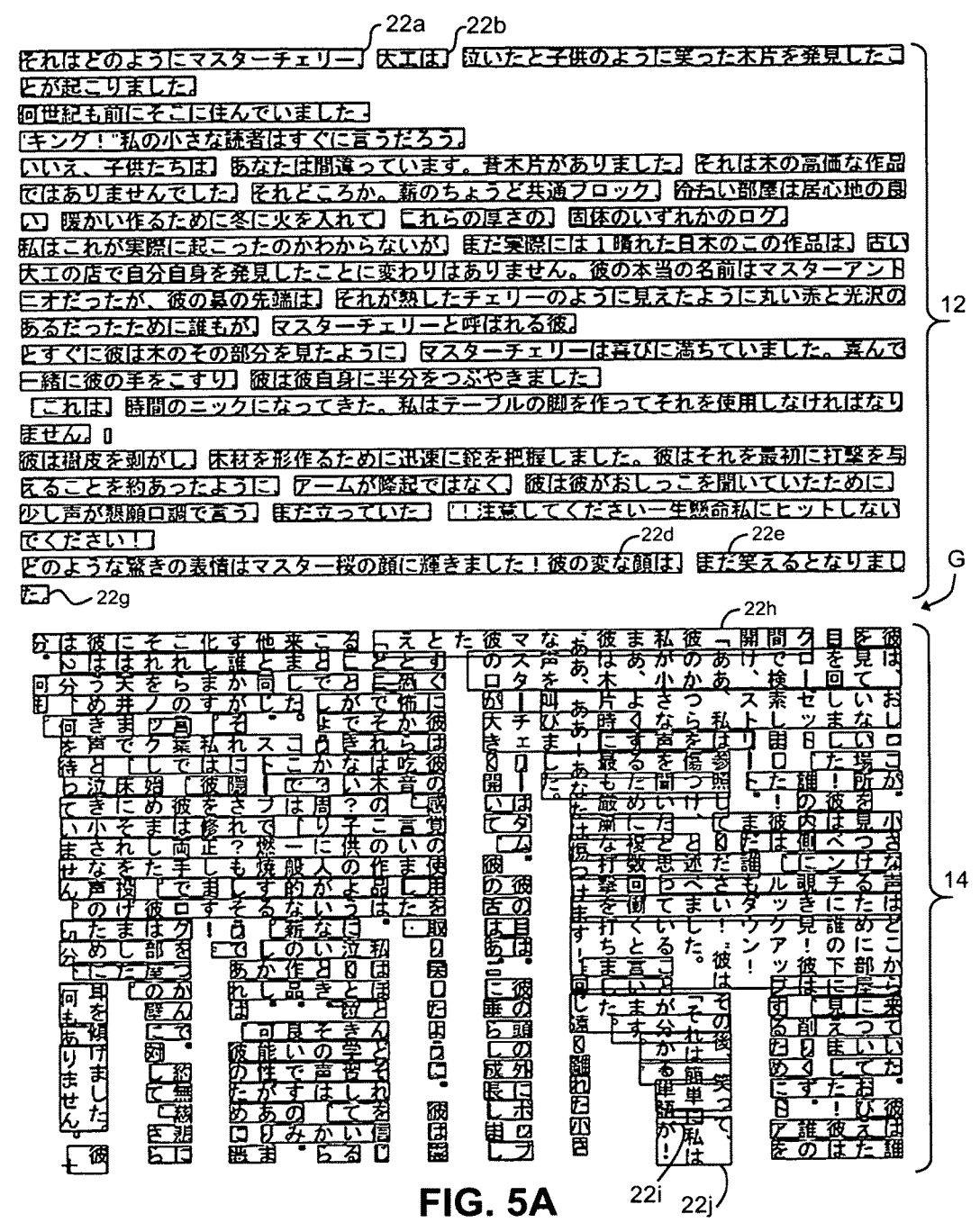
Figure 5B:
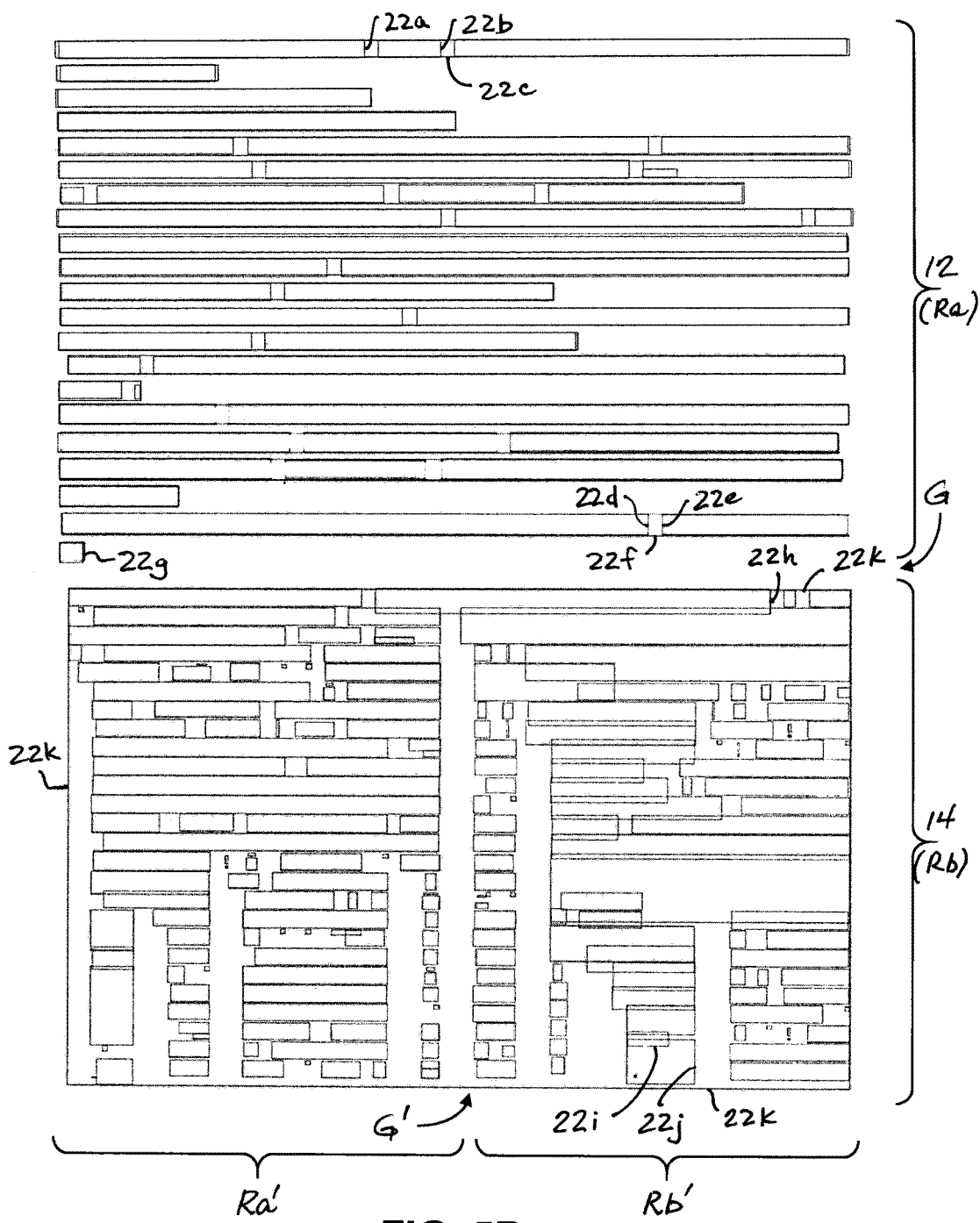
FIG. 5B is a diagram showing an example result of a line consolidating process performed on the horizontal line bounding boxes of FIG. 5A.

FIGS. 5A and 5B illustrate the progression from horizontal line finding process to horizontal line consolidation process for image 10 of FIG. 1. FIG. 5A shows an example result upon completion of the horizontal line finding process, in which all character connected components were evaluated to define a plurality of horizontal line bounding boxes 22. Note that each horizontal line bounding box 22 occupies a position interval in the vertical direction. FIG. 5B shows an example result upon completion of the horizontal line consolidation process, in which the position intervals are evaluated. Position intervals that overlap are merged to become a single position interval, and corresponding horizontal line bounding boxes are merged to become a single horizontal line bounding box.

In FIG. 5B, the top section corresponding to horizontal text 12 has horizontal line bounding boxes (HBB) that merged. HBB 22a and 22b are merged to become HBB 22c. Also, HBB 22d and 22e are merged to become HBB 22f. However, HBB 22g did not merge with any other HBB. In the top section, the horizontal line bounding boxes have not all merged together. This is because some position intervals (such as position intervals for HBB 22c, 22f, and 22g) still did not overlap after completion of the line consolidation process.

In FIG. 5B, the bottom section corresponding to vertical text 14 has horizontal line bounding boxes (HBB) that all merged together, unlike HBB in the top section. In the bottom section, HBB 22h, 22i, and 22j merged to become HBB 22k. This occurred when groups of position intervals overlapped and thereby enlarged, and then the enlarged position intervals overlapped with other position intervals and thereby enlarged again and again. This corresponds to horizontal line bounding boxes that progressively enlarge and merge together until a single horizontal line bounding box (namely, HBB 22k) encompasses the entire bottom section.

The above processes are repeated for image 10 in the vertical direction. The vertical line finding process evaluates each character bounding box (CBB) to determine whether it should be merged with an existing vertical line bounding box (VBB) or begin a new vertical line bounding box. The vertical line finding process can be performed by rotating image 10 by ninety degrees, and subjecting the rotated image to the same process described above for finding horizontal lines. However, for ease of discussion and not for the purpose of limiting the invention, the following description for the vertical line finding process uses directional terms (e.g., Y-axis, height, and width) that are consistent with image 10 (the non-rotated, original image).

The vertical line finding process may proceed from bottom to top of image 10, starting with the character bounding box located closest to the bottom of image 10, and ending with the character bounding box located closest to the top of image 10. The location of each character bounding box (e.g., a Y-axis coordinate of the bottom edge) was determined during the CC analysis. The current character bounding box (CBB) under evaluation is merged with an existing vertical line bounding box (VBB) if they are sufficiently close to each other in the vertical direction and sufficiently aligned in the horizontal direction. If the current CBB is the first one to be evaluated, then it starts its own VBB since there are not yet any existing VBB.

Figures 6A, 6B, 6C:
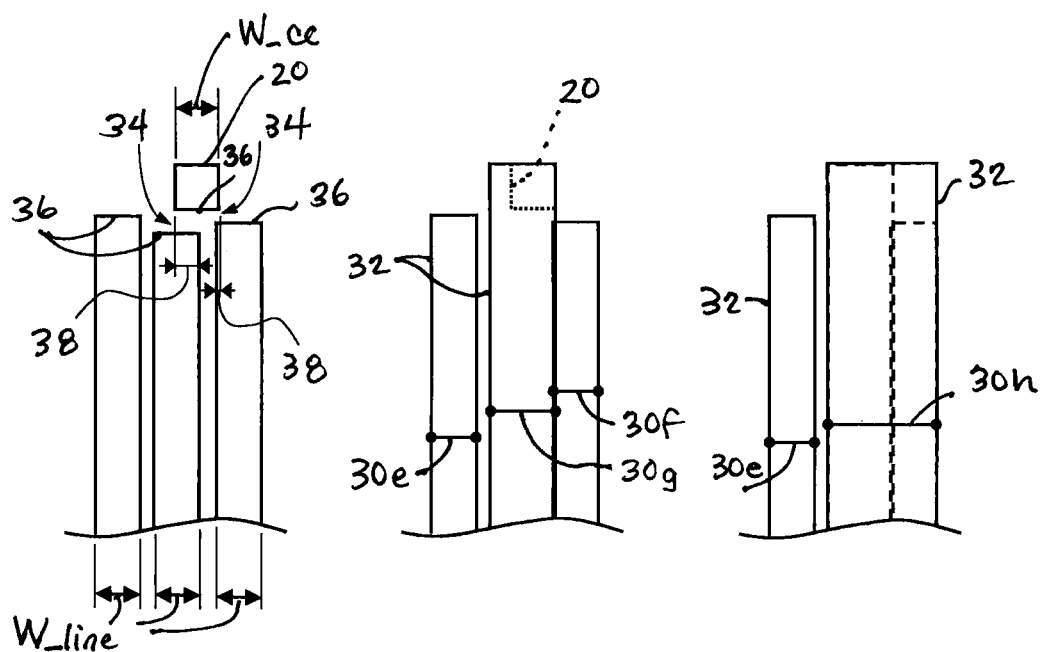
FIGS. 6A-6C are schematic diagrams showing example vertical line bounding boxes defined from character connected components.

FIG. 6A shows an example in which many character bounding boxes 20 have been evaluated, which resulted in at least three vertical line bounding boxes (VBB) 32 to be defined. One CBB 20 is illustrated, which is the current CBB under evaluation. CBB 20 is compared to all existing VBB 22 to determine if any existing VBB is sufficiently close to CBB 20. An existing VBB is sufficiently close in the vertical direction if vertical gap 34 between proximal ends 36 of CBB and existing VBB is less than or equal to a vertical gap maximum. Proximal ends 36 are defined as the horizontal ends of the CBB and VBB that are nearest to each other. The vertical gap maximum can be a value that is based on the connected component median height (H_m). For example, the vertical gap maximum can be 2×H_m. The vertical gap maximum can be based on the connected component average stroke thickness (T_avg). For example, the vertical gap maximum can be 8×T_avg. In another example, both H_m and T_avg are considered such that the vertical gap maximum is equal to the lesser of 2×H_m and 8×T_avg, where 2 and 8 are referred to as multipliers. Other multipliers may be used as discussed above for the horizontal line finding process. The vertical gap maximum is satisfied by the existing VBB when its vertical gap is less than or equal to the vertical gap maximum. If there is no existing VBB that satisfies the vertical gap maximum, the current CBB under evaluation becomes a VBB, i.e., the current CBB under evaluation starts a new vertical line bounding box. However, it is possible that there are multiple existing VBB that satisfy the vertical gap maximum.

Next, all existing VBB 32 that satisfied the vertical gap maximum are compared to the current CBB under evaluation to determine if any of them are sufficiently aligned in the horizontal direction. An existing VBB is sufficiently aligned if projected horizontal overlap 38 of the CBB and VBB is greater than or equal to a projected horizontal overlap minimum. As shown, it is possible for the CBB and VBB to not touch each other. Horizontal overlap 38 is determined from a projection of the CBB toward the VBB. A projected horizontal overlap occurs when a projection of any of the left or right ends of the CBB intersects the VBB. The projected horizontal overlap can be measured, for example, as the horizontal distance between (A) and (B), where (A) is the left or right end of the CBB that interests the VBB and (B) is opposite end of the VBB. If the left end of the CBB intersects the VBB, the opposite end is the right end of the VBB. If the right end of the CBB intersects, the opposite end is the left end of the VBB. If both the right and left ends of the CBB intersect the VBB, the projected overlap is equal to the width (W_cc) of the CBB. The projected horizontal overlap minimum can be a value that is based on the width (W_line) of the VBB. For example, the projected horizontal overlap minimum can be ¼ of W_line. The projected horizontal overlap minimum can be based on the width (W_cc) of the CBB. For example, the projected horizontal overlap minimum can be ¼×W_cc. In another example, both W_line and W_cc are considered such that the projected horizontal overlap minimum is equal to the lesser of ¼×W_line and ¼×W_cc. Instead of ¼, another multiplier can be used as was discussed for the horizontal line finding process. The projected horizontal overlap minimum is satisfied by the VBB if its projected horizontal overlap is greater than or equal to the projected horizontal overlap minimum. If there is no VBB that satisfies the projected horizontal overlap minimum, the CBB becomes a VBB, i.e., the CBB starts a new vertical line bounding box. Otherwise, the CBB is merged with the VBB having the greatest projected horizontal overlap.

FIG. 6B shows an example result in which the current CBB 20 is merged with an existing VBB (referred to as a target vertical line bounding box). The target VBB is redefined as required to fully enclose current CBB 20. That is, the target VBB is enlarged in the vertical direction if necessary to enclose the current CBB. The existing VBB is enlarged in the horizontal direction if necessary to enclose the current CBB. After all CBB are evaluated, a consolidation process is performed in which any VBB which overlap are merged to form a single VBB.

FIG. 6C shows an example result of a consolidation process performed on vertical line bounding boxes (VBB). FIG. 6C continues from FIGS. 6A and 6B. Assuming that CBB 20 in FIG. 6A is the last CBB to be evaluated for image 10, then two VBB 32 which overlap in FIG. 6B are merged to form single VBB 32 shown in FIG. 6C. Although only two VBB are merged in this example, it is to be understood that the consolidation process would merge all VBB that overlap. For example, three, four, or more VBB could be merged. Also, it is possible that all VBB are merged into one. Note that it is possible for two positions intervals to overlap even though the corresponding VBBs do not touch. For example, two VBBs may be located above and below each other and spaced apart while their position intervals (defined by X-axis coordinates in the horizontal direction) overlap.

Figure 6D:
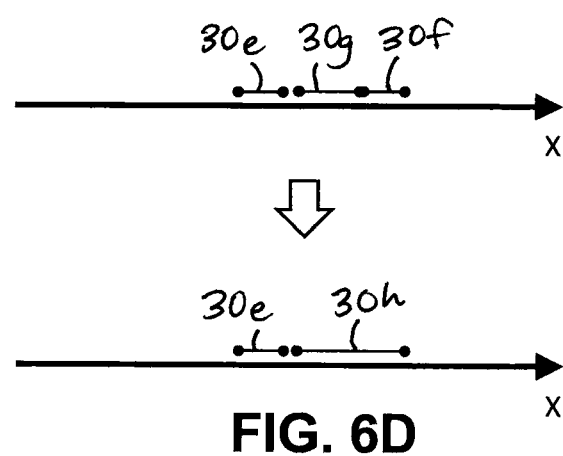
FIG. 6D is a schematic diagram showing an example interval map for the vertical line bounding boxes of FIGS. 6B and 6C.

FIG. 6D shows an interval map that can be used to perform the consolidation process for vertical line bounding boxes (VBB) in FIG. 6B. Each VBB 32, immediately after completion of the vertical line finding process, occupies position interval 30 in the horizontal direction. Each end of the position interval has an X-axis coordinate, which allows each position interval to be evaluated in relation to other position intervals to detect an interval overlap. The X-axis coordinates can be determined ahead of time, during the CC analysis. Initially, the interval map would include position intervals 30 of all HBB before completion of the consolidation process. During the consolidation process, all intervals are evaluated such that an interval having an endpoint between two endpoints of any other interval would be merged with the other interval to form a single interval in the interval map. In this example, intervals 30e and 30f are merged to become single enlarged interval 30h. FIG. 6D shows only a few intervals. In general, there may be many more intervals which may also enlarge due to consolidation, if the intervals overlap. Further, the enlarged intervals may merge if they overlap.

Figure 7A:
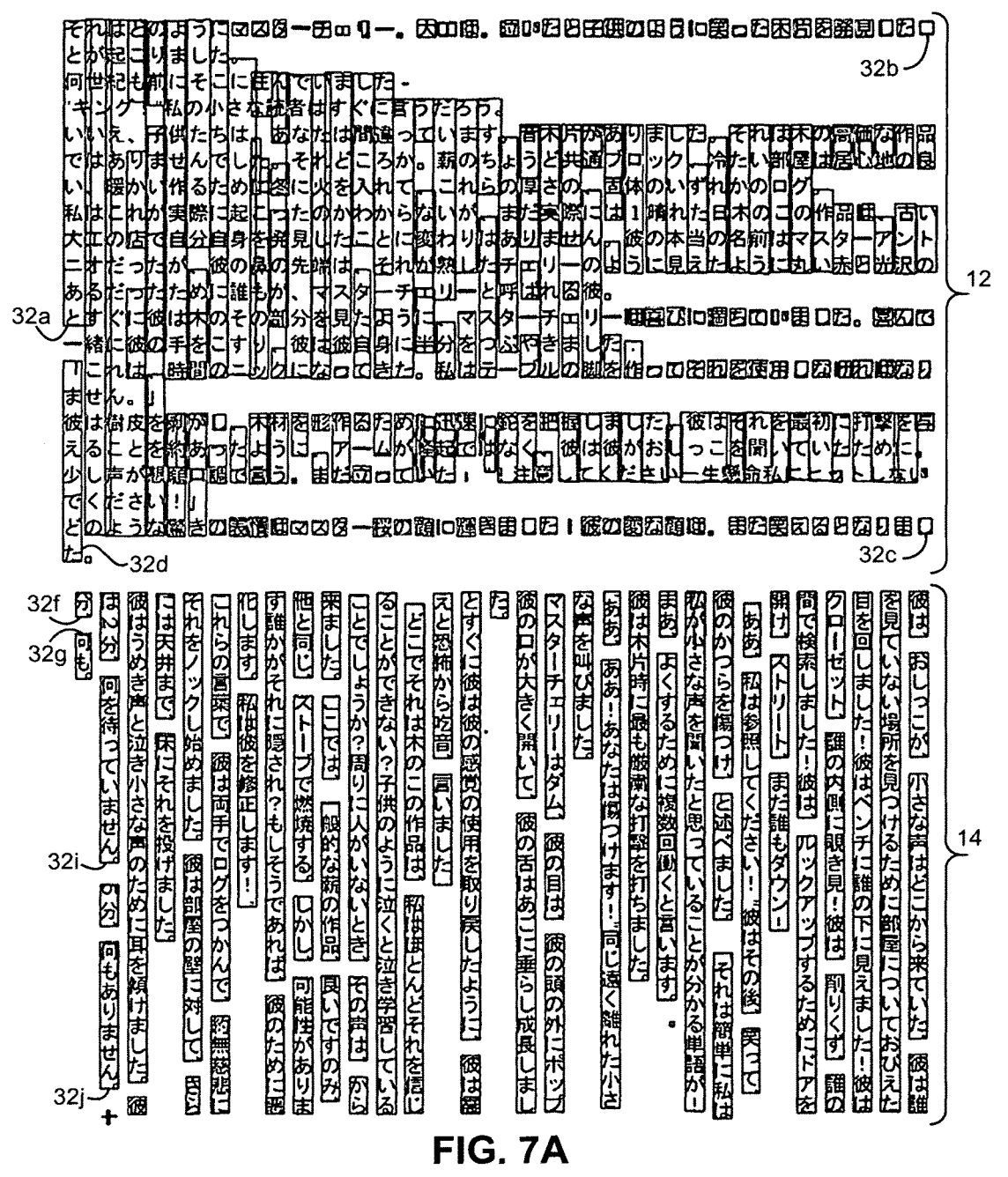
Figure 7B:
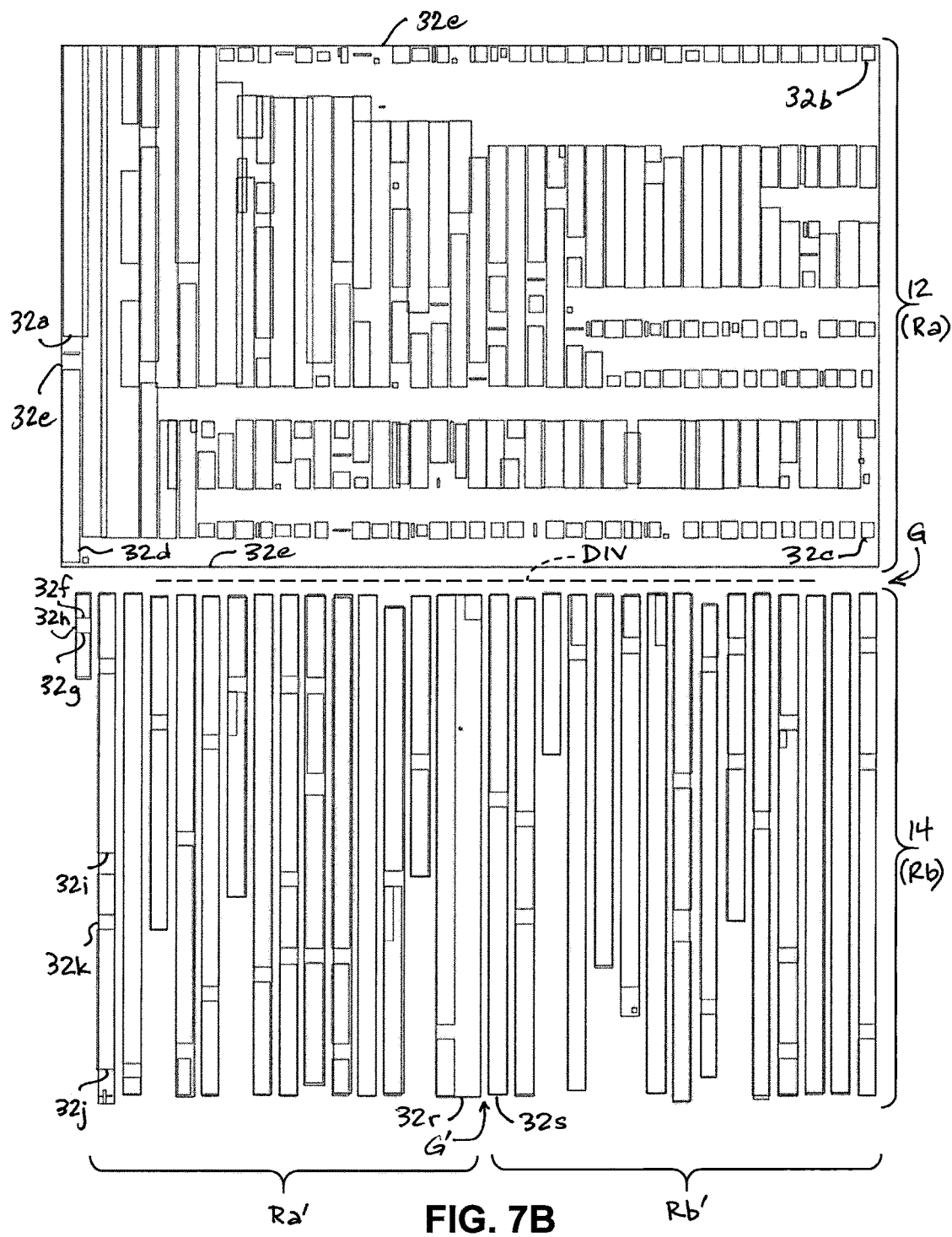
FIG. 7B is a diagram showing an example result of a line consolidating process performed on the vertical line bounding boxes of FIG. 7A.

FIGS. 7A and 7B illustrate the progression from vertical line finding process to vertical line consolidation process for image 10 of FIG. 1. FIG. 7A shows an example result upon completion of the vertical line finding process, in which all character connected components were evaluated to define a plurality of vertical line bounding boxes 32. Each vertical line bounding box 32 occupies a position interval in the horizontal direction. FIG. 7B shows an example result upon completion of the vertical line consolidation process, in which the position intervals are evaluated for overlap. Position intervals that overlap are merged to become a single position interval, and corresponding vertical line bounding boxes are merged to become a single vertical line bounding box.

In FIG. 7B, the top section corresponding to horizontal text 12 has vertical line bounding boxes (VBB) that all merged together. In this example, VBB 32a, 32b, 32c, and 32d merged to become VBB 32e. This occurred when groups of position intervals overlapped and thereby enlarged, and then the enlarged position intervals overlapped with other position intervals and thereby enlarged again and again. This corresponds to vertical line bounding boxes that progressively enlarge and merge together until a single vertical line bounding box (namely, VBB 32e) encompasses the entire top section.

In FIG. 7B, the bottom section corresponding to vertical text 14 has vertical line bounding boxes (VBB) that merged. In this example, VBB 32f and 32g are merged to become VBB 32h. Also, VBB 32i and 32j merged to become VBB 32k. In the bottom section, the vertical line bounding boxes have not all merged together. This is because some position intervals (such as position intervals for VBB 32h and 32k) still did not overlap after completion of the line consolidation process.

As described above, vertical and horizontal line bounding boxes are defined by evaluating all CBB one by one, causing the line bounding boxes to enlarge, and possibly causing the line bounding boxes to have overlapping position intervals. Line bounding boxes that overlap are consolidated to form even larger line bounding boxes. Applicant has found that in a section of the image containing horizontal text, vertical line bounding boxes may tend to be larger and/or spaced close together due to misalignment of characters. For the same reason, horizontal line bounding boxes may tend to be larger and/or spaced closed together in a section of the image containing vertical text. These findings can be used to determine the likelihood that a region contains text arranged in one particular direction, either horizontal or vertical. On a more granular level, variations in the size and/or spacing of the individual line bounding boxes may be used to identify a division, such as an imaginary dividing line, between horizontal and vertical text.

Applicant has found that the position of the division often lies between a pair of adjacent line bounding boxes that are significantly different in size and/or spacing. One line bounding box in the pair may satisfy size and/or spacing requirements, which may indicate that the line bounding box happens to be arranged in the same direction as the text contained within it. The other line bounding box in the pair may fail to satisfy those requirements, which may indicate that the line bounding box is not arranged in the same direction as the text contained within it. FIG. 5B shows an example of one such pair of horizontal line bounding boxes (HBB) that are significantly different in size and/or spacing. For the purpose of discussion in this example, HBB 22g satisfies size and/or spacing requirements, indicating that HBB 22g happens to be arranged in the same direction (horizontal) as the text within it. HBB 22g is adjacent to HBB 22k. For the purpose of discussion in this example, HBB 22k fails to satisfy those requirements, indicating that HBB 22k is arranged in a direction (namely, horizontal) that is not the same direction as the text within it. Therefore, the gap between HBB 22g and 22k can be considered to be a candidate for the position of a division between horizontal and vertical text without actually knowing that HBB 22g contains horizontal text and HBB 22k contains vertical text.

Figure 8A:
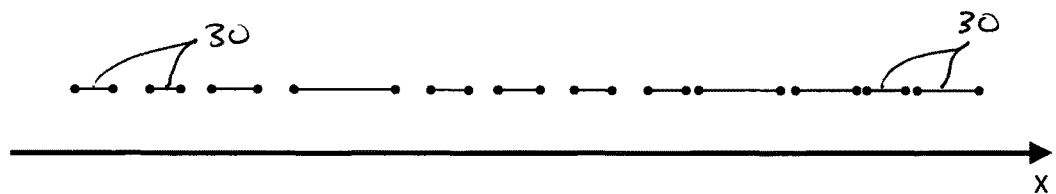
FIGS. 8A-8D are schematic diagrams showing an example interval map for vertical line bounding boxes, the interval map including discordant pairs of position intervals.
Figure 8B:
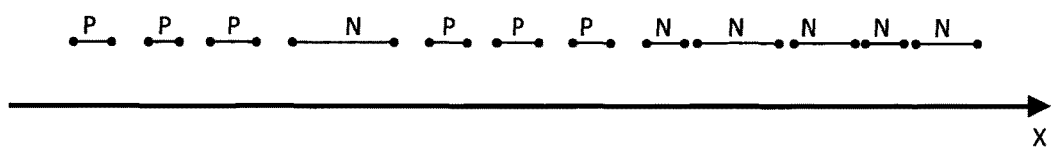
Figure 8C:
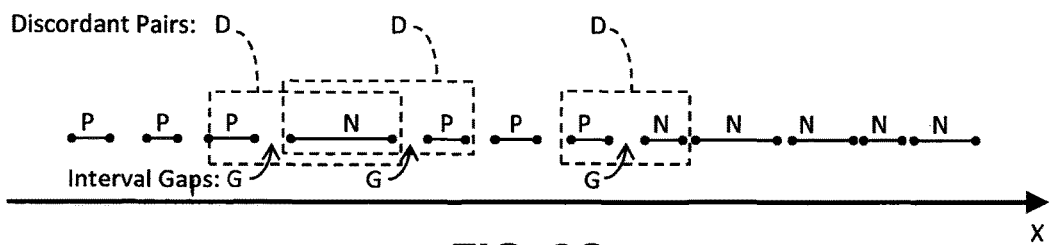

FIGS. 8A to 8C shows an example interval map, after completion of the line consolidation process, that can be used to identify pairs of adjacent line bounding boxes that are significantly different in size and/or spacing. The interval map is oriented horizontally, which indicates that the interval map shows position intervals for vertical line bounding boxes as discussed in connection with FIGS. 6A-6C.

For each position interval 30 of the vertical line bounding boxes, it is determined whether the position interval is a positive position interval or a negative position interval. The position interval is determined to be positive when the position interval satisfies one or both of a vertical evaluating size range and a vertical evaluating spacing minimum.

The vertical evaluating size range sets a range for the size of the position interval. This checks whether the position interval is too small or large. The size of an individual position interval is the difference between its endpoint coordinates. For vertical line bounding boxes, the position interval can be visualized as the width of the bounding box.

The vertical evaluating size range can be based on a median size (PI_m) among all the position intervals in the interval map for vertical line bounding boxes (VBB). For example, the evaluating size range can be defined as PI_m+/−A, where A is an allowance. A position interval of a VBB satisfies the vertical evaluating size range on condition that its size is from PI_m−A to PI_m+A. Allowance A can be equal to M×PI_m, where M is a multiplier. M can be 0.5. Other multipliers can be used such as 0.3 and 0.8 to obtain more reliable results. If PI_m=10 pixels and M=0.5, then the vertical evaluating size range will be from 5 to 15 pixels. In another example, allowance A can be the greater of (M×PI_m) and N_a. N_a is a fixed number of pixels and prevents A from becoming too small. N_a can be 4 pixels. Other values for N_a can be used such as 3 and 6 pixels to obtain more reliable results. If PI_m=6 pixels, M=0.5, and N_a=4, then the vertical evaluating size range will be from 2 to 10 pixels.

The vertical evaluating spacing minimum sets a minimum distance between the position interval of the vertical line bounding box (VBB) which is being evaluated and the position intervals of adjacent vertical line bounding boxes. This checks whether the vertical line bounding box might be too close to others. A position interval of a VBB satisfies the vertical evaluating spacing minimum on condition that it is separated from adjacent position intervals by a distance greater than or equal to the vertical evaluating spacing minimum. The vertical evaluating spacing minimum can be equal to a fixed number of pixels, N_space. N_space can be 10 pixels. Other values can be N_space can be used such as 8 and 12 pixels to obtain more reliable results.

FIG. 8B shows an example result after each position interval 30 of the vertical line bounding boxes was evaluated. In this example, the position interval is determined to be a positive position interval (P) on condition that the position interval satisfies both the vertical evaluating size range and vertical evaluating spacing minimum. The position interval is determined to be a negative position interval (N) when the position interval fails to satisfy any of the vertical evaluating size range and vertical evaluating spacing minimum.

FIG. 8C shows discordant pairs (D) of position intervals among the vertical line bounding boxes. Each discordant pair has a positive position interval (P) and a negative position interval (N) adjacent to the positive position interval. There is gap interval (G) between the positive position interval and the negative position interval. For each gap interval, there are two interval regions each located on opposite sides of the gap interval.

Figure 8D:
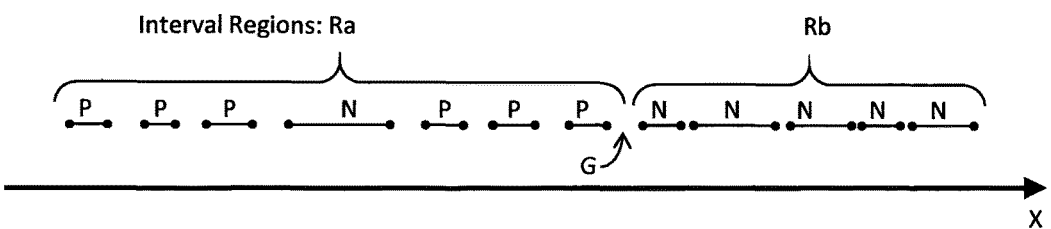

In FIG. 8D, two interval regions Ra and Rb are identified for gap interval G of one of the discordant pairs. Interval region Ra has six positive position intervals P. Interval region Rb has zero positive position intervals P.

Figure 9:
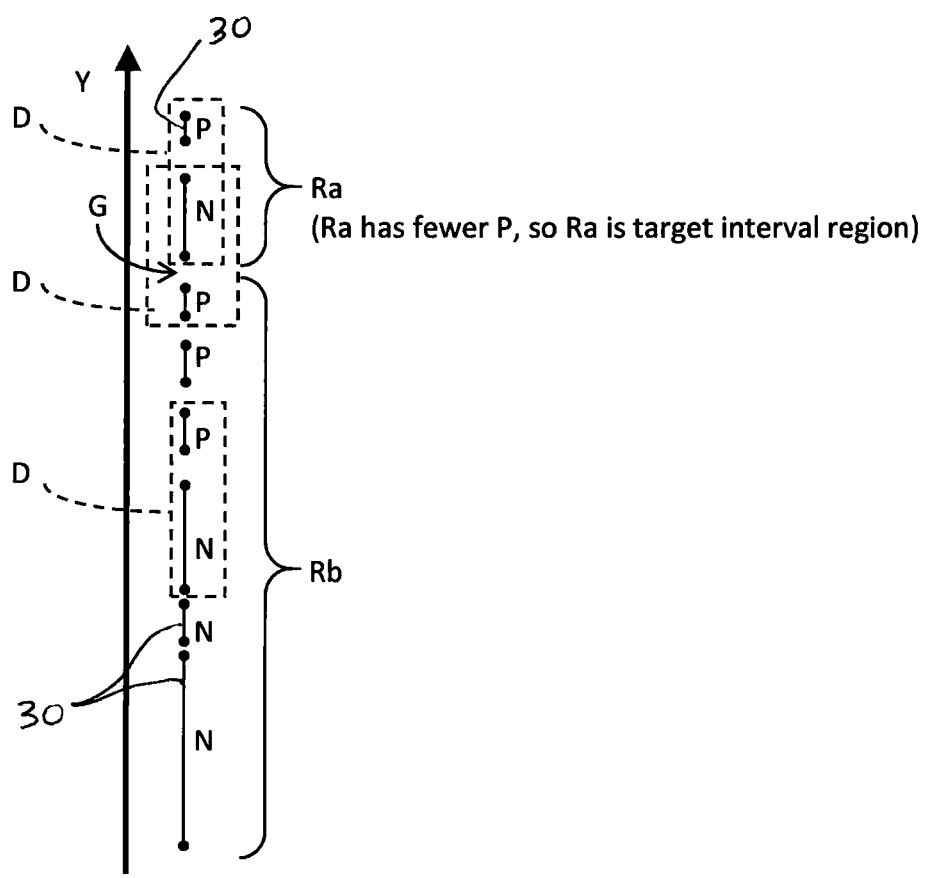
FIG. 9 is a schematic diagram showing an example interval map for horizontal line bounding boxes, the interval map including discordant pairs of position intervals.

FIG. 9 shows an example interval map showing position intervals 30 for horizontal line bounding boxes. For horizontal line bounding boxes, the position interval can be visualized as the height of the bounding box. For each position interval 30 of the horizontal line bounding boxes, it is determined whether the position interval is a positive position interval or a negative position interval. The position interval is determined to be positive when the position interval satisfies one or both of a horizontal evaluating size range and a horizontal evaluating spacing minimum. The horizontal evaluating size range can be based on a median size (PI_m) among all the position intervals in the interval map for horizontal line bounding boxes (HBB). For example, the horizontal evaluating size range can be PI_m+/−A, as described for the vertical evaluating size range. A position interval of an HBB satisfies the horizontal evaluating size range on condition that its size is from PI_m−A to PI_m+A.

The horizontal evaluating spacing minimum sets a minimum distance between the position interval of the horizontal line bounding box which is being evaluated and the position intervals of adjacent horizontal line bounding boxes. This checks whether the horizontal line bounding box might be too close to others. A position interval of an HBB satisfies the horizontal evaluating spacing minimum on condition that it is separated from adjacent position intervals by a distance greater than or equal to the horizontal evaluating spacing minimum. The horizontal evaluating spacing minimum can be equal to a fixed number of pixels, N_space. N_space can be the same as or different from N_space used during evaluation of vertical line bounding boxes.

In the example of FIG. 9, there are three discordant pairs D of position intervals. Two interval regions Ra and Rb are identified for gap interval G of one of the discordant pairs. Interval region Ra has one positive position interval P. Interval region Rb has three positive position intervals P.

Figure 10:
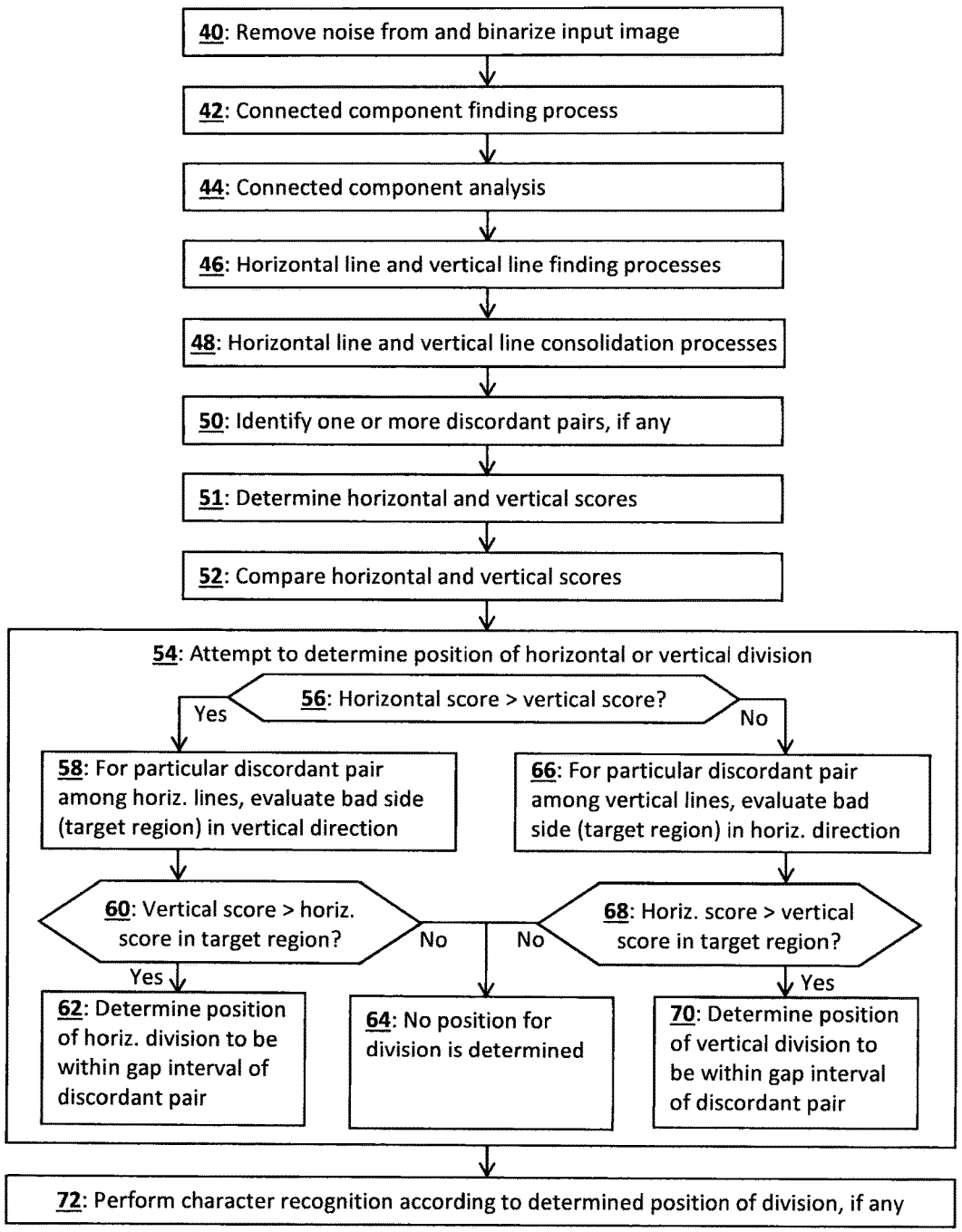
FIG. 10 is a flow diagram showing an example method for processing an image with a mixture of horizontal and vertical text.

FIG. 10 shows an example method for processing an image containing a mixture of horizontal and vertical text. At block 40, a noise removal process and a binarization process are applied to an input image to obtain a binary image as previously described. At block 42, a connected component finding process is performed as previously described. At block 44, a connected component analysis is performed as previously described. At block 46, a horizontal line finding process and a vertical line finding process are performed as previously described. At block 48, a horizontal line consolidation process and a vertical line consolidation process are performed as previously described. At block 50, for each position interval among the vertical line bounding boxes, the position interval is determined to be positive or negative as previously described. Similarly, for each position interval among the horizontal line bounding boxes, the position interval is determined to be positive or negative. Discordant pairs of position intervals are then identified.

At block 51, a horizontal score and a vertical score are determined. The horizontal score is determined for the plurality of horizontal line bounding boxes. It is determined from one or both of size and spacing of the horizontal line bounding boxes. Size of the horizontal line bounding box can be represented by the size of its position interval, and the position interval can be compared to a horizontal evaluating size range, as previously described. Spacing of the horizontal line bounding box refers to a horizontal distance, which can be compared to a horizontal evaluating spacing minimum, as previously described.

For example, horizontal score (S_horiz) can be derived from an overall proportion of positive position intervals among the horizontal line bounding boxes. The horizontal score can be calculated as $$S\_horiz = P\_horiz / PN\_horiz,$$

where P_horiz is the total number positive position intervals among the horizontal line bounding boxes, and PN_horiz is the total number of position intervals (positive and negative) among the horizontal line bounding boxes.

Similarly, the vertical score is determined for the plurality of vertical line bounding boxes. It is determined from one or both of size and spacing of the vertical line bounding boxes. For example, vertical score (S_vert) can be derived from an overall proportion of positive position intervals among the vertical line bounding boxes. The vertical score can be calculated as $$S\_vert = P\_vert / PN\_vert,$$

where P_vert is the total number positive position intervals among the vertical line bounding boxes, and PN_vert is the total number of position intervals (positive and negative) among the vertical line bounding boxes.

At block 52, the horizontal and vertical scores are compared. At block 54, a position of a division between the horizontal and vertical texts is determined from the comparison at block 52. The division can be a vertical division between the horizontal and vertical texts or a horizontal division between the horizontal and vertical texts.

Block 54 may comprise blocks 56 to 70. At block 56, the greater of the horizontal and vertical scores is identified. If S_horiz>S_vert, the process proceeds to block 58 to verify that a horizontal division can be identified to be within a gap interval (G) of a particular discordant pair (D) among the horizontal line bounding boxes (HBB). If S_horiz<S_vert, the process proceeds to block 66 to verify that a vertical division can be identified to be within a gap interval (G) of a particular discordant pair (D) among the vertical line bounding boxes (VBB).

At block 58, for a particular discordant pair of position intervals among HBB, the process performs a vertical evaluation on a "bad side" of the interval gap. Recall that a discordant pair comprises positive position interval P, negative position interval N, and gap interval G there between. There are two interval regions Ra and Rb, each located on opposite sides of the gap interval. The "bad side" is the interval region among Ra and Rb that has the lower number of positive position intervals among horizontal line bounding boxes (HBB). The bad side will the target of further evaluation. Hereafter, the term "target interval region" is used for the bad side since it will be the target of further evaluation. In FIG. 9 for example, interval region Ra is the target interval region.

Reasons for evaluating the target interval will now be discussed with reference to the example of FIGS. 5B and 7B with the assumption that the S_horiz>S_vert for the text in image 10 of FIG. 1. In FIG. 5B, S_horiz=21/22. In FIG. 7B, S_vert=29/31.

In FIG. 5B, a discordant pair of position intervals exists for HBB 22g and 22k, since HBB 22g satisfies size and spacing requirements and HBB 22k fails to satisfy size and spacing requirements. Its relatively large size suggests that HBB 22k is arranged in a direction (namely, horizontal) that is not the same direction as the text within it. That is, text in HBB 22k might contain vertical text, a table with horizontal text, a drawing, or other graphic object. The process of blocks 58-62 will deduce whether HBB 22k contains vertical text. Interval gap G (not to be confused with G') is indicated in the figure between position intervals of HBB 22g and 22k. Also, interval regions Ra and Rb (not to be confused with Ra' and Rb') are indicated in the figure on opposite sides of gap G. In this example, Rb is the target interval since it as a fewer number (namely, zero) of positive position intervals compared to Ra located on the opposite side.

The process will deduce whether the target interval contains vertical text by evaluating the target interval alone in the horizontal direction to get a reference score (S_ref) and then in the vertical direction to get a comparative score (S_comp), followed by determining whether there is a score improvement toward the vertical direction.

The reference score can be a proportion of positive position intervals among the horizontal line bounding boxes in the target interval region, and can be calculated as $$S\_ref = P\_horiz\_target / PN\_horiz\_target,$$

where P_horiz_target is the total number positive position intervals among the horizontal line bounding boxes in the target interval, and PN_horiz_target is the total number of position intervals (positive and negative) among the horizontal line bounding boxes in the target interval. For example, target interval region Rb in FIG. 5B has zero positive position intervals out of one, so S_ref=0/1.

The comparative score can be a proportion of positive position intervals among the vertical line bounding boxes in the target interval region, and can be calculated as $$S\_comp = P\_vert\_target / PN\_vert\_target,$$

where P_vert_target is the total number positive position intervals among the vertical line bounding boxes in the target interval, and PN_vert_target is the total number of position intervals (positive and negative) among the vertical line bounding boxes in the target interval. FIG. 7B shows the vertical line bounding boxes for target interval region Rb. We assume for purposes of discussion that the process has determined that target interval region Rb (corresponding to the bottom half of FIG. 7B) has 29 positive position intervals out of 30, so S_comp=29/30.

At block 60, the process determines whether there is a score improvement toward the vertical direction by comparing the vertical score (S_comp) against the horizontal score (S_ref). If there is an improvement (S_comp>S_ref), then the process deduces that the target interval contains vertical text, and the process proceeds to block 62. Otherwise, the process proceeds to block 64.

At block 62, the process determines the position of a horizontal division to be in the gap interval of the discordant pair. In FIG. 7B for example, the process determines the position of horizontal division DIV to be in gap interval G of the discordant pair of position intervals for HBB 22g and 22k of FIG. 5B.

After block 62, the process proceeds to block 72 in which character recognition is performed according to the position determined at block 62.

At block 64, the comparative score is not greater than the reference score. The process deduces that the target interval region does not contain vertical text. For example, the target interval region may actually contain horizontal text, a drawing, a chart with horizontal text, or other graphical object. Therefore, the process does not determine the position of a horizontal division to be in the gap interval of the discordant pair. The process may end, or the process may proceed by selecting another discordant pair to be the particular discordant pair to arrive at block 62 instead of block 64.

Blocks 66 to 70 will now be described with reference to FIGS. 5B and 7B with the assumption that the S_horiz<S_vert.

At block 66, for a particular discordant pair of position intervals among vertical line bounding boxes (VBB), the process performs a horizontal evaluation on a "bad side" (target interval region) of the interval gap. The target interval region is identified and evaluated. In FIG. 7B, a discordant pair of position intervals exists for VBB 32r and 32s (see bottom of the figure), on the assumption that the process has determined that VBB 32s satisfies size and spacing requirements and VBB 32r fails to satisfy size and spacing requirements. Its relatively large size suggests that VBB 32r is arranged in a direction (namely, vertical) that is not the same direction as the text within it. That is, text in VBB 32k might contain horizontal text, a table with vertical text, a drawing, or other graphic object. The process of blocks 66-70 will deduce whether VBB 32r contains horizontal text. Interval gap G' (not to be confused with G) is indicated in the figure between position intervals of VBB 32r and 32s. Also, interval regions Ra' and Rb' (not to be confused with Ra and Rb) are indicated in the figure on opposite sides of gap G'. In this example, Ra' has 14 positive position intervals, and Rb' has 15 positive position intervals. Ra' is the target interval since it as a fewer number of positive position intervals compared to Ra'.

The process will deduce whether the target interval contains horizontal text by evaluating the target interval alone in the vertical direction to get a reference score (S_ref) and then in the horizontal direction to get a comparative score (S_comp), followed by determining whether there is a score improvement toward the horizontal direction.

The reference score can be a proportion of positive position intervals among the vertical line bounding boxes in the target interval region, and can be calculated as $$S\_ref = P\_vert\_target / PN\_vert\_target,$$

where P_vert_target is the total number positive position intervals among the vertical line bounding boxes in the target interval, and PN_vert_target is the total number of position intervals (positive and negative) among the vertical line bounding boxes in the target interval. For example, target interval region Ra' in FIG. 7B has 14 positive position intervals out of 15, so S_ref=14/15.

The comparative score can be a proportion of positive position intervals among the horizontal line bounding boxes in the target interval region, and can be calculated as $$S\_comp = P\_horiz\_target / PN\_horiz\_target,$$

where P_horiz_target is the total number positive position intervals among the horizontal line bounding boxes in the target interval, and PN_horiz_target is the total number of position intervals (positive and negative) among the horizontal line bounding boxes in the target interval. FIG. 5B shows the horizontal line bounding boxes for target interval Ra'. We assume for purposes of discussion that the process has determined that target interval region Ra' (corresponding to the bottom half of FIG. 5B) has zero positive position intervals out of one, so S_comp=0/1. Note that interval region Ra' contains only one horizontal line bounding box, namely HBB 22k which failed to satisfy size and/or spacing requirements.

At block 68, the process determines whether there is a score improvement toward the horizontal direction by comparing the horizontal score (S_comp) against the vertical score (S_ref). If there is an improvement (S_comp>S_ref), then the process deduces that the target interval contains horizontal text, and the process proceeds to block 70. Block 70 determines the position of a vertical division to be in the gap interval of the discordant pair only if S_comp>S_ref. In this example, S_comp=0/1 and S_ref=14/15. Therefore, the process proceeds to block 64 instead of block 70 for this example.

At block 64, the process deduces that the target interval region does not contain horizontal text. For example, the target interval region may actually contain vertical text, a drawing, a chart, or other graphical object. Therefore, the process does not determine the position of a vertical division to be in the gap interval of the discordant pair. The process may end, or the process may proceed by selecting another discordant pair to be the particular discordant pair to arrive at block 70 instead of block 64.

In general, an interval map may identify a plurality of discordant pairs D, as shown for example in FIGS. 8C and 9. The process may comprise selecting the particular discordant pair at block 58 or block 66 from among the plurality of discordant pairs. Take for example two discordant pairs D1 and D2. For D1, S_comp>S_ref. For D2, S_ref<S_comp. The process selects D1 based on D1 succeeding (because S_comp>S_ref) and D2 failing (because S_ref<S_comp).

Figure 11:
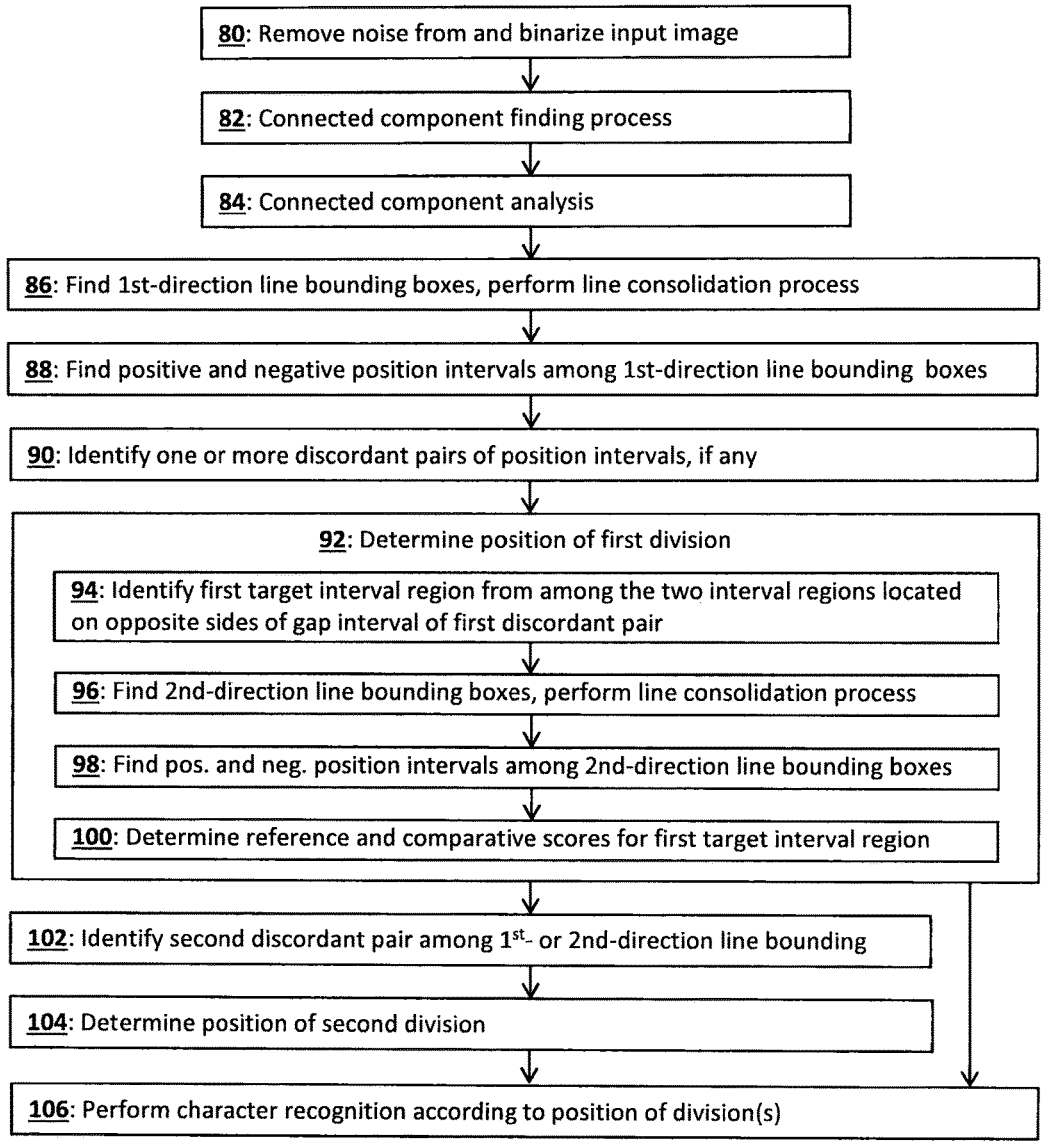
FIG. 11 is a flow diagram showing another example method for processing an image with a mixture of horizontal and vertical text.

FIG. 11 shows another example method for processing an image containing a mixture of horizontal and vertical text. At block 80, a noise removal process and a binarization process are applied to an input image to obtain a binary image. At block 82, a connected component finding process is performed as previously described. At block 84, a connected component analysis is performed as previously described.

At block 86, a line finding process is performed as previously described. The line finding process can be performed to find a plurality of first-direction line bounding boxes. The first direction can be either horizontal or vertical. If the first direction is horizontal, the line finding process finds horizontal line bounding boxes. If the first direction is vertical, the line finding process finds vertical line bounding boxes. Also, a line consolidation process, as previously described, is performed on the first-direction line bonding boxes.

At block 88, for each position interval among the first-direction line bounding boxes, the position interval is determined to be positive or negative as previously described. At block 90, the process identifies a first discordant pair of position intervals among the first-direction line bounding boxes. For example, the first discordant pair could be discordant pair D located closest to the bottom of FIG. 9.

At block 92, a position of the division between the horizontal and vertical texts is determined to be within a gap interval of the first discordant pair. The determination of position can be performed through use of reference and comparative scores for a target interval region, as described for blocks 58-62 or blocks 66-70 in FIG. 10.

Block 92 may comprise blocks 94 to 98. At block 94, a first target interval region is identified from among two interval regions located on opposite sides of the gap interval of the first discordant pair. The first target interval region has a lower number of positive position intervals than the interval region on the opposite side.

At block 96, a line finding process is performed as previously described. The line finding process is performed to find a plurality of second-direction line bounding boxes. If the first-direction line bounding boxes are horizontal, then the second direction line bounding boxes are vertical. A line consolidation process is performed on the second-direction line bounding boxes.

At block 98, for each position interval among the second-direction line bounding boxes, the position interval is determined to be positive or negative as previously described. At block 100, the process identifies a reference score being a proportion of positive position intervals among the first-direction line bounding boxes in the first target interval region. The process also identifies a comparative score being a proportion of positive position intervals among the second-direction line bounding boxes in the first target interval region.

The position of the division is determined to be within the gap interval of the first discordant pair on condition that the comparative score is greater than the reference score. The process may include a step for selecting the first discordant pair from a plurality of discordant pairs among the first-direction line bounding boxes. The first discordant pair is selected based, at least, on the comparative score being greater than the reference score.

As mentioned above, there may be a plurality of discordant pairs among the first-direction line bounding boxes. Thus, block 90 may also identify an additional discordant pair of position intervals among the first-direction line bounding boxes. For example, the additional discordant pair could be discordant pair D located closest to the top of FIG. 9. Next at block 94, the process may also identify an additional target interval region from among the two interval regions located on opposite sides of the gap interval of the additional discordant pair. Block 100 may also include determining, for the additional target interval region, an additional reference score and an additional comparative score. The additional reference score is a proportion of positive position intervals among the first-direction line bounding boxes in the additional target interval region. The additional comparative score is a proportion of positive position intervals among the second-direction line bounding boxes in the additional target interval region. The first discordant pair is selected over the additional discordant pair based, at least, on failure of the additional reference score to be greater than the additional comparative score.

Figure 12:
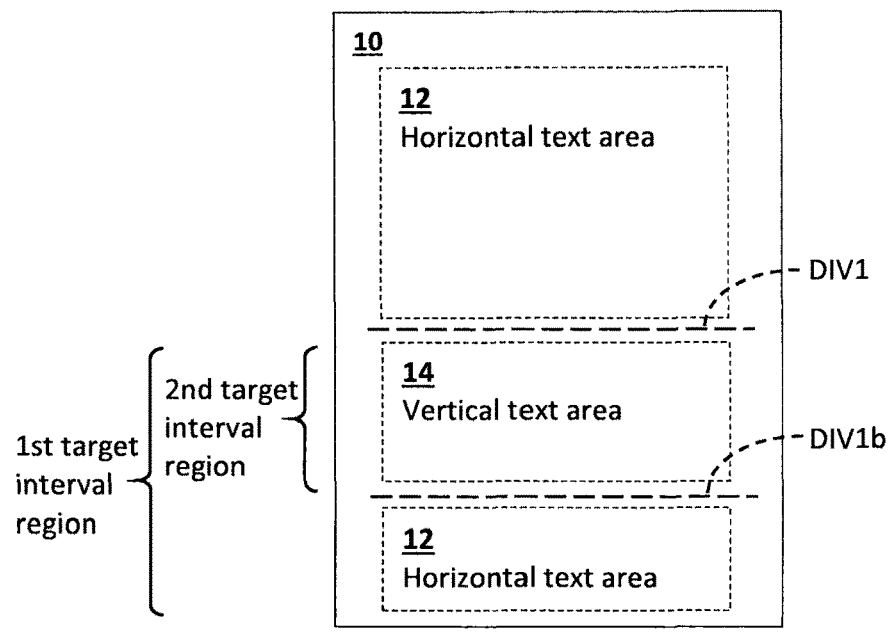
FIGS. 12 and 13 are schematic diagrams showing two divisions that separate horizontal and vertical text areas.
Figure 13:
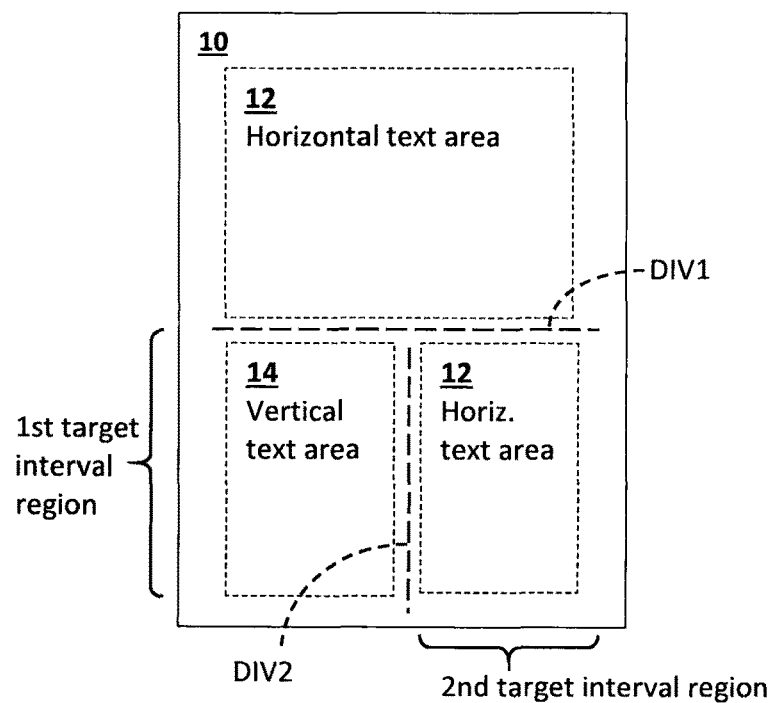

The process may proceed to block 106 in which character recognition is performed according to the position determined at block 92. At block 92, the division (DIV1) is parallel to the first direction. Alternatively, the process may proceed to block 102 to find another division, since it is possible for image 10 to contain more than one division that separates areas of horizontal and vertical text. For example, it is possible that the first target interval region encompasses a horizontal text area and a vertical text area which are separated from each other by a second division (DIV1b) parallel to the first direction. For example, this situation is depicted in FIG. 12 in which the first direction is horizontal. Also, it is possible that the first target interval region encompasses a mixture of horizontal and vertical text separated by a second division (DIV2) parallel to the second direction. For example, this situation is depicted in FIG. 13 in which the second direction is vertical.

To find DIV1b, block 102 is performed to identify a second discordant pair of position intervals among the first-direction line bounding boxes in the first target interval region. Next, at block 104 the process determines a position of second division DIV1b as being within the gap interval of the second discordant pair. Second division DIV1b separates horizontal and vertical text areas in the first target interval region. The position of second division DIV1b can be determined through use of reference and comparative scores for a second target interval region, as described for blocks 58-62 or blocks 66-70 in FIG. 10. The second target interval region is the bad side of the gap interval of the second discordant pair identified at block 102. The second target interval region can be seen in FIG. 12, for example, as a portion of the first target interval region.

To find DIV2, block 102 is performed to identify a second discordant pair of position intervals among the second-direction line bounding boxes instead of the first-direction line bounding boxes. Next, at block 104 the process determines a position of second division DIV2 as being within the gap interval of the second discordant pair. The position of second division DIV2 can be determined through use of reference and comparative scores for a second target interval region, as described for blocks 58-62 or blocks 66-70 in FIG. 10. The second target interval region is the bad side of the gap interval of the second discordant pair identified at block 102. The second target interval region can be seen in FIG. 13, for example, as a portion of the first target interval region.

After block 104, the process proceeds to block 106 in which character recognition is performed according to the position determined for DIV1 and either DIV1b or DIV2.

The character recognition process at block 106 (and block 72 in FIG. 10) could be performed with greater accuracy and speed that comes from having deduced that text on one side of the determined position is horizontal text and/or having deduced that text on the opposite side of the determined position is vertical text. For example, a first character recognition algorithm may be applied to an area of image 10 which has been deduced to contain horizontal text. The first character recognition algorithm may be tailored to associate adjacent characters in the horizontal direction, such that a subsequent user search for the word "fox" will find instances in which characters f, o and x are sequentially arranged in the horizontal direction. Greater processing speed may be achieved in that the first character recognition algorithm need not try to associate adjacent characters in the vertical direction, which can conserve computing resources when processing an area of the image containing only horizontal text. Additionally, a second character recognition algorithm may be applied to an area of image 10 which has been deduced to contain vertical text. The second character recognition algorithm may be tailored to associate characters that are vertically adjacent, such that a subsequent user search for the word "fox" will find instances in which characters f, o and x are sequentially arranged in the vertical direction. Greater processing speed may be achieved in that the second character recognition algorithm need not try to associate adjacent characters in the horizontal direction, which can conserve computing resources when processing an area of the image containing only vertical text.

Figure 14:
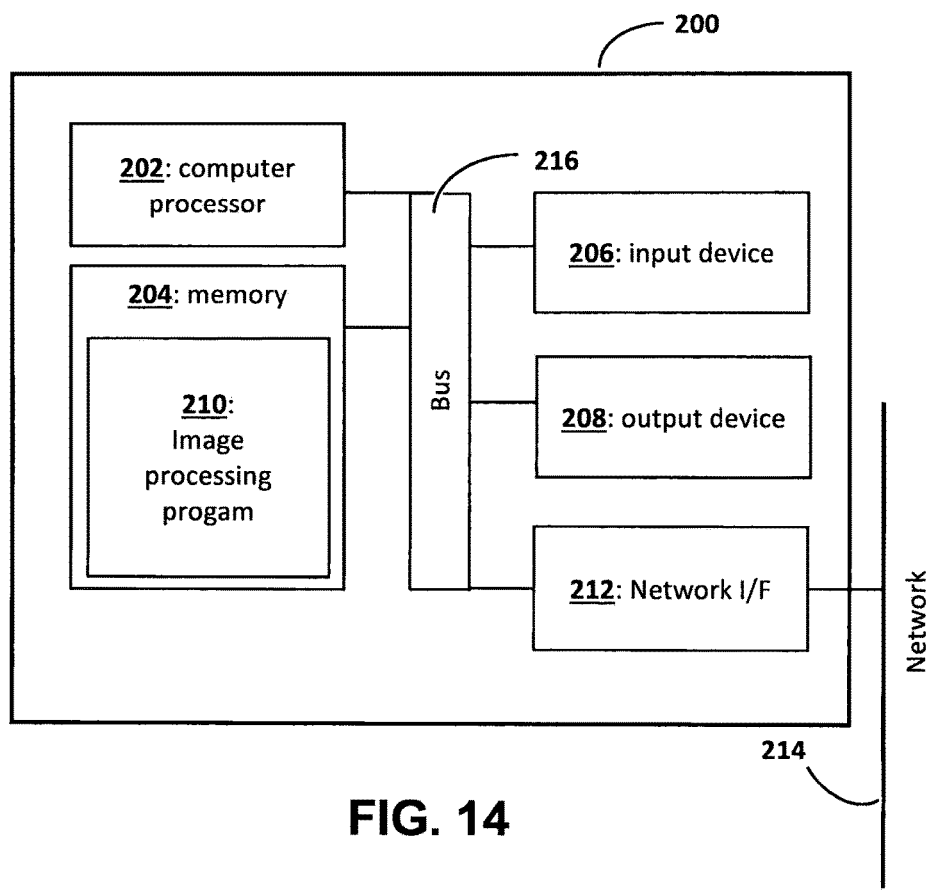
FIG. 14 is a schematic diagram showing an example apparatus for image processing according to FIGS. 10 and 11.

FIG. 14 shows example apparatus 200 configured to perform the methods and processes described herein. Apparatus 200 can be a server, computer workstation, personal computer, laptop computer, tablet, smartphone, facsimile machine, printing machine, multi-functional peripheral (MFP) device that has the functions of a printer and scanner combined, or other type of machine that includes one or more computer processors and memory.

Apparatus 200 includes one or more computer processors 202 (CPUs), one or more computer memory devices 204, one or more input devices 206, and one or more output devices 208. The one or more computer processors 202 are collectively referred to as processor 202. Processor 202 is configured to execute instructions. Processor 202 may include integrated circuits that execute the instructions. The instructions may embody one or more software modules for performing the processes described herein. The one of more software modules are collectively referred to as image processing program 210.

The one or more computer memory devices 204 are collectively referred to as memory 204. Memory 204 includes any one or a combination of random-access memory (RAM) modules, read-only memory (ROM) modules, and other electronic devices. Memory 204 may include mass storage device such as optical drives, magnetic drives, solid-state flash drives, and other data storage devices. Memory 204 includes a non-transitory computer readable medium that stores image processing program 210.

The one or more input devices 206 are collectively referred to as input device 206. Input device 206 may be used to create image 10. Input device 206 may be used to create a grayscale or color input image that is binarized to form image 10. Input device 206 may include an optical scanner having a camera and light source and which is configured to scan a document page to create image 10. Input device 206 can allow a person (user) to enter data and interact with apparatus 200. Input device 206 may include any one or more of a keyboard with buttons, touch-sensitive screen, mouse, electronic pen, and other types of devices that can allow the user to edit or conduct a search on an encoded version of image 10 that has been subjected to a character recognition process.

The one or more output devices 208 are collectively referred to as output device 208. Output device 208 may include a liquid crystal display, projector, or other type of visual display device. Output device 208 may be used to display image 10 or an encoded version of image 10 that has been subjected to a character recognition process. Output device 208 may include a printer that prints image 10.

Apparatus 200 includes network interface (I/F) 212 configured to allow apparatus 200 to communicate with other machines through network 214, such as a local area network (LAN), a wide area network (WAN), the Internet, and telephone communication carriers. Network I/F 212 may include circuitry enabling analog or digital communication through network 214. For example, network I/F 212 may be configured to receive image 10 from another machine connected to network 214. Network I/F 212 may be configured to transmit an encoded version of image 10 that has been subjected to a character recognition process. Network I/F 212 may be used to transmit positions for one or more divisions separating horizontal and vertical text. The division positions may be transmitted via network 214 to another machine that performs a character recognition process according to the division positions. The above-described components of apparatus 200 are communicatively coupled to each other through communication bus 216.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A method for processing an image containing horizontal text arranged in a horizontal direction and vertical text arranged in a vertical direction, the method comprising:
   determining a horizontal score for a plurality of horizontal line bounding boxes, the horizontal score determined from one or both of size and spacing of the horizontal line bounding boxes, the plurality of horizontal line bounding boxes defined from character connected components in the horizontal text and the vertical text, each of the horizontal line bounding boxes occupying a position interval in the vertical direction;
   determining a vertical score for a plurality of vertical line bounding boxes, the vertical score determined from one or both of size and spacing of the vertical line bounding boxes, the plurality of vertical line bounding boxes defined from the character connected components in the horizontal text and the vertical text, each of the vertical line bounding boxes occupying a position interval in the horizontal direction;
   comparing the horizontal score and the vertical score; and
   determining from the comparison of the horizontal and vertical scores, either a position of a horizontal division between the horizontal and vertical texts or a position of a vertical division between the horizontal and vertical texts.

2. The method of claim 1, wherein
   the determining of a horizontal score comprises
      for each of the position intervals of the horizontal line bounding boxes, determining whether the position interval is a positive position interval or a negative position interval, the position interval of the horizontal line bounding box determined to be a positive position interval on condition that the position interval satisfies one or both of a horizontal evaluating size range and a horizontal evaluating spacing minimum,
      determining an overall proportion of positive position intervals among the horizontal line bounding boxes, and
      deriving the horizontal score from the overall proportion of positive position intervals among the horizontal line bounding boxes; and
   the determining of a vertical score comprises
      for each of the position intervals of the vertical line bounding boxes, determining whether the position interval is a positive position interval or a negative position interval, the position interval of the vertical line bounding box determined to be a positive position interval on condition that the position interval satisfies one or both of a vertical evaluating size range and a vertical evaluating spacing minimum,
      determining an overall proportion of positive position intervals among the vertical line bounding boxes, and
      deriving the vertical score from the overall proportion of positive position intervals among the vertical line bounding boxes.

3. The method of claim 2, further comprising:
   using a median size of the position intervals of the horizontal line bounding boxes to determine the horizontal evaluating size range; and
   using a median size of the position intervals of the vertical line bounding boxes to determine the vertical evaluating size range.

4. The method of claim 2, wherein
   the determining of a position of a horizontal division between the horizontal and vertical texts comprises:
      identifying a discordant pair of the position intervals among the horizontal line bounding boxes, the discordant pair having a positive position interval and a negative position interval adjacent to the positive position interval, there being a gap interval between the positive position interval and the negative position interval, there being two interval regions each located on opposite sides of the gap interval;
      identifying a target interval region from among the two interval regions located on opposite sides of the interval gap, the target interval region having a lower number of positive position intervals than the interval region on the opposite side,
      determining a reference score being a proportion of positive position intervals among the horizontal line bounding boxes in the target interval region,
      determining a comparative score being a proportion of positive position intervals among the vertical line bounding boxes in the target interval region, and
      determining the position of the horizontal division as being within the gap interval when the comparative score is greater than the reference score; and
   the determining of a position of a vertical division between the horizontal and vertical texts comprises:
      identifying a discordant pair of the position intervals among the vertical line bounding boxes, each discordant pair having a positive position interval and a negative position interval adjacent to the positive position interval, there being a gap interval between the positive position interval and the negative position interval, there being two interval regions each located on opposite sides of the gap interval, identifying a target interval region from among the two interval regions located on opposite sides of the interval gap, the target interval region having a lower number of positive position intervals than the interval region on the opposite side, determining a reference score being a proportion of positive position intervals among the vertical line bounding boxes in the target interval region, determining a comparative score being a proportion of positive position intervals among the horizontal line bounding boxes in the target interval region, and determining the position of the vertical division as being within the gap interval when the comparative score is greater than the reference score.

5. The method of claim 1, further comprising:

before the determining of the horizontal score, performing a horizontal line finding process to define the plurality of horizontal line bounding boxes, the horizontal line finding process comprising, for each of the character connected components:

determining whether a horizontal gap between the character connected component and a target horizontal line bounding box satisfies a horizontal gap maximum, the target horizontal line bounding box being one among the plurality of horizontal line bounding boxes, determining whether a projected vertical overlap of the character connected component and the target horizontal line bounding box satisfies a projected vertical overlap minimum, and redefining the target horizontal line bounding box to include the character connected component on condition that both the horizontal gap maximum and the projected vertical overlap minimum are satisfied; and before the determining of the vertical score, performing a vertical line finding process to define the plurality of vertical line bounding boxes, the vertical line finding process comprising, for each of the character connected components:

determining whether a vertical gap between the character connected component and a target vertical line bounding box satisfies a vertical gap maximum, the target vertical line bounding box being one among the plurality of vertical line bounding boxes, determining whether a projected horizontal overlap of the character connected component and the target vertical line bounding box satisfies a projected horizontal overlap minimum, and redefining the target vertical line bounding box to include the character connected component on condition that both the vertical gap maximum and the projected horizontal overlap minimum are satisfied.

6. An apparatus for processing an image with horizontal text arranged in a horizontal direction and vertical text arranged in a vertical direction, the apparatus comprising:

a processor; and a memory in communication with the processor, the memory storing instructions, wherein the processor is configured to perform a process on the image according to the stored instructions, the process comprising:

determining a horizontal score for a plurality of horizontal line bounding boxes, the horizontal score determined from one or both of size and spacing of the horizontal line bounding boxes, the plurality of horizontal line bounding boxes defined from character connected components in the horizontal text and the vertical text, each of the horizontal line bounding boxes occupying a position interval in the vertical direction;

determining a vertical score for a plurality of vertical line bounding boxes, the vertical score determined from one or both of size and spacing of the vertical line bounding boxes, the plurality of vertical line bounding boxes defined from the character connected components in the horizontal text and the vertical text, each of the vertical line bounding boxes occupying a position interval in the horizontal direction;

comparing the horizontal score and the vertical score; and determining from the comparison of the horizontal and vertical scores, either a position of a horizontal division between the horizontal and vertical texts or a position of a vertical division between the horizontal and vertical texts.

7. The apparatus of claim 6, wherein the determining of a horizontal score comprises for each of the position intervals of the horizontal line bounding boxes, determining whether the position interval is a positive position interval or a negative position interval, the position interval of the horizontal line bounding box determined to be a positive position interval on condition that the position interval satisfies one or both of a horizontal evaluating size range and a horizontal evaluating spacing minimum, determining an overall proportion of positive position intervals among the horizontal line bounding boxes, and deriving the horizontal score from the overall proportion of positive position intervals among the horizontal line bounding boxes; and the determining of a vertical score comprises for each of the position intervals of the vertical line bounding boxes, determining whether the position interval is a positive position interval or a negative position interval, the position interval of the vertical line bounding box determined to be a positive position interval on condition that the position interval satisfies one or both of a vertical evaluating size range and a vertical evaluating spacing minimum, determining an overall proportion of positive position intervals among the vertical line bounding boxes, and deriving the vertical score from the overall proportion of positive position intervals among the vertical line bounding boxes.

8. The apparatus of claim 7, wherein the process performed by the processor further comprises:

using a median size of the position intervals of the horizontal line bounding boxes to determine the horizontal evaluating size range; and using a median size of the position intervals of the vertical line bounding boxes to determine the vertical evaluating size range.

9. The apparatus of claim 7, wherein the determining of a position of a horizontal division between the horizontal and vertical texts comprises:

identifying a discordant pair of the position intervals among the horizontal line bounding boxes, the discordant pair having a positive position interval and a negative position interval adjacent to the positive position interval, there being a gap interval between the positive position interval and the negative position interval, there being two interval regions each located on opposite sides of the gap interval;

identifying a target interval region from among the two interval regions located on opposite sides of the interval gap, the target interval region having a lower number of positive position intervals than the interval region on the opposite side, determining a reference score being a proportion of positive position intervals among the horizontal line bounding boxes in the target interval region, determining a comparative score being a proportion of positive position intervals among the vertical line bounding boxes in the target interval region, and determining the position of the horizontal division as being within the gap interval when the comparative score is greater than the reference score; and the determining of a position of a vertical division between the horizontal and vertical texts comprises:

identifying a discordant pair of the position intervals among the vertical line bounding boxes, each discordant pair having a positive position interval and a negative position interval adjacent to the positive position interval, there being a gap interval between the positive position interval and the negative position interval, there being two interval regions each located on opposite sides of the gap interval, identifying a target interval region from among the two interval regions located on opposite sides of the interval gap, the target interval region having a lower number of positive position intervals than the interval region on the opposite side, determining a reference score being a proportion of positive position intervals among the vertical line bounding boxes in the target interval region, determining a comparative score being a proportion of positive position intervals among the horizontal line bounding boxes in the target interval region, and determining the position of the vertical division as being within the gap interval when the comparative score is greater than the reference score.

10. The apparatus of claim 6, wherein the process performed by the processor further comprises:

before the determining of the horizontal score, performing a horizontal line finding process to define the plurality of horizontal line bounding boxes, the horizontal line finding process comprising, for each of the character connected components:

determining whether a horizontal gap between the character connected component and a target horizontal line bounding box satisfies a horizontal gap maximum, the target horizontal line bounding box being one among the plurality of horizontal line bounding boxes, determining whether a projected vertical overlap of the character connected component and the target horizontal line bounding box satisfies a projected vertical overlap minimum, and redefining the target horizontal line bounding box to include the character connected component on condition that both the horizontal gap maximum and the projected vertical overlap minimum are satisfied; and before the determining of the vertical score, performing a vertical line finding process to define the plurality of vertical line bounding boxes, the vertical line finding process comprising, for each of the character connected components:

determining whether a vertical gap between the character connected component and a target vertical line bounding box satisfies a vertical gap maximum, the target vertical line bounding box being one among the plurality of vertical line bounding boxes, determining whether a projected horizontal overlap of the character connected component and the target vertical line bounding box satisfies a projected horizontal overlap minimum, and redefining the target vertical line bounding box to include the character connected component on condition that both the vertical gap maximum and the projected horizontal overlap minimum are satisfied.

11. A non-transitory computer-readable medium having stored thereon computer readable instructions that, when executed by a processor of an apparatus, cause the apparatus to perform a process on an image with horizontal text arranged in a horizontal direction and vertical text arranged in a vertical direction, the process comprising:

determining a horizontal score for a plurality of horizontal line bounding boxes, the horizontal score determined from one or both of size and spacing of the horizontal line bounding boxes, the plurality of horizontal line bounding boxes defined from character connected components in the horizontal text and the vertical text, each of the horizontal line bounding boxes occupying a position interval in the vertical direction;

determining a vertical score for a plurality of vertical line bounding boxes, the vertical score determined from one or both of size and spacing of the vertical line bounding boxes, the plurality of vertical line bounding boxes defined from the character connected components in the horizontal text and the vertical text, each of the vertical line bounding boxes occupying a position interval in the horizontal direction;

comparing the horizontal score and the vertical score; and determining from the comparison of the horizontal and vertical scores, either a position of a horizontal division between the horizontal and vertical texts or a position of a vertical division between the horizontal and vertical texts.

12. The non-transitory computer-readable medium of claim 11, wherein the determining of a horizontal score comprises for each of the position intervals of the horizontal line bounding boxes, determining whether the position interval is a positive position interval or a negative position interval, the position interval of the horizontal line bounding box determined to be a positive position interval on condition that the position interval satisfies one or both of a horizontal evaluating size range and a horizontal evaluating spacing minimum, determining an overall proportion of positive position intervals among the horizontal line bounding boxes, and deriving the horizontal score from the overall proportion of positive position intervals among the horizontal line bounding boxes; and the determining of a vertical score comprises for each of the position intervals of the vertical line bounding boxes, determining whether the position interval is a positive position interval or a negative position interval, the position interval of the vertical line bounding box determined to be a positive position interval on condition that the position interval satisfies one or both of a vertical evaluating size range and a vertical evaluating spacing minimum, determining an overall proportion of positive position intervals among the vertical line bounding boxes, and deriving the vertical score from the overall proportion of positive position intervals among the vertical line bounding boxes.

13. The non-transitory computer-readable medium of claim 12, wherein the process performed by the apparatus further comprises:

using a median size of the position intervals of the horizontal line bounding boxes to determine the horizontal evaluating size range; and using a median size of the position intervals of the vertical line bounding boxes to determine the vertical evaluating size range.

14. The non-transitory computer-readable medium of claim 12, wherein the determining of a position of a horizontal division between the horizontal and vertical texts comprises:

identifying a discordant pair of the position intervals among the horizontal line bounding boxes, the discordant pair having a positive position interval and a negative position interval adjacent to the positive position interval, there being a gap interval between the positive position interval and the negative position interval, there being two interval regions each located on opposite sides of the gap interval;

identifying a target interval region from among the two interval regions located on opposite sides of the interval gap, the target interval region having a lower number of positive position intervals than the interval region on the opposite side, determining a reference score being a proportion of positive position intervals among the horizontal line bounding boxes in the target interval region, determining a comparative score being a proportion of positive position intervals among the vertical line bounding boxes in the target interval region, and determining the position of the horizontal division as being within the gap interval when the comparative score is greater than the reference score; and the determining of a position of a vertical division between the horizontal and vertical texts comprises:

identifying a discordant pair of the position intervals among the vertical line bounding boxes, each discordant pair having a positive position interval and a negative position interval adjacent to the positive position interval, there being a gap interval between the positive position interval and the negative position interval, there being two interval regions each located on opposite sides of the gap interval, identifying a target interval region from among the two interval regions located on opposite sides of the interval gap, the target interval region having a lower number of positive position intervals than the interval region on the opposite side, determining a reference score being a proportion of positive position intervals among the vertical line bounding boxes in the target interval region, determining a comparative score being a proportion of positive position intervals among the horizontal line bounding boxes in the target interval region, and determining the position of the vertical division as being within the gap interval when the comparative score is greater than the reference score.

15. The non-transitory computer-readable medium of claim 11, wherein the process performed by the apparatus further comprises:

before the determining of the horizontal score, performing a horizontal line finding process to define the plurality of horizontal line bounding boxes, the horizontal line finding process comprising, for each of the character connected components:

determining whether a horizontal gap between the character connected component and a target horizontal line bounding box satisfies a horizontal gap maximum, the target horizontal line bounding box being one among the plurality of horizontal line bounding boxes, determining whether a projected vertical overlap of the character connected component and the target horizontal line bounding box satisfies a projected vertical overlap minimum, and redefining the target horizontal line bounding box to include the character connected component on condition that both the horizontal gap maximum and the projected vertical overlap minimum are satisfied; and before the determining of the vertical score, performing a vertical line finding process to define the plurality of vertical line bounding boxes, the vertical line finding process comprising, for each of the character connected components:

determining whether a vertical gap between the character connected component and a target vertical line bounding box satisfies a vertical gap maximum, the target vertical line bounding box being one among the plurality of vertical line bounding boxes, determining whether a projected horizontal overlap of the character connected component and the target vertical line bounding box satisfies a projected horizontal overlap minimum, and redefining the target vertical line bounding box to include the character connected component on condition that both the vertical gap maximum and the projected horizontal overlap minimum are satisfied.

* * * * *